United States Patent [19]

Nolan

[11] Patent Number: 5,933,599
[45] Date of Patent: *Aug. 3, 1999

[54] APPARATUS FOR PRESENTING THE CONTENT OF AN INTERACTIVE ON-LINE NETWORK

[75] Inventor: Sean P. Nolan, Issaquah, Wash.

[73] Assignee: Microsoft Corporation, Redmond, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/503,131

[22] Filed: Jul. 17, 1995

[51] Int. Cl.$^6$ .............................. G06F 13/38; G06F 15/17
[52] U.S. Cl. ............................... 395/200.48; 395/200.33; 345/330
[58] Field of Search ............................ 395/200.1, 200.2, 395/200.03, 200.04, 200.11, 200.15, 330, 762, 200.5, 200.8, 200.31, 200.34, 200.54, 200.68, 200.49, 200.47, 200.33, 200.48; 345/330

[56] References Cited

U.S. PATENT DOCUMENTS

| | | |
|---|---|---|
| 4,184,200 | 1/1980 | Wagner . |
| 4,280,176 | 7/1981 | Tan . |
| 4,432,057 | 2/1984 | Daniell et al. . |
| 4,493,024 | 1/1985 | Baxter . |
| 4,799,153 | 1/1989 | Hann . |

(List continued on next page.)

OTHER PUBLICATIONS

Heylighen, F.;"World–Wide Web: a distributed paradigm for global networking"; Proceeding. SHARE Europe Spring Conference pp. 355–368, Apr. 18, 1994.

Colton, Malcolm, "Replicated Data in a Distributed Environment," *IEEE* (1993).

Coulouris et al., "Distributed Transactions," Chapter 14 of *Distributed Systems Concepts and Design* 2$^{nd}$ *Ed.*, 409–421 (1994).

Cox, John, "Sybase Server to Add Complexity User for Challenge with Data Replication," *Communication* No. 483 (1993).

Custer, Helen, "The Object Manager and Object Security," *Inside Windows NT*, Chapter 3, 40–43, 49–81 (1993).

Eckerson, Wayne, "Users Give Green Light for Replication," *Network World* (Jul. 19, 1993).

Edelstein, Herb, "The Challenge of Replication," *DBMS* vol. 8, No. 4, 68 (Apr. 1995).

Edelstein, Herb, "Microsoft and Sybase are Adding their Unique Touches to SQl Servers," *Information Week*, No. 528, 62 (1995).

Edelstein, Herb, "Replication Data," *DBMS* vol. 6, No. 6, 59 (Jun. 1993).

Goulde, Michael, "RDBMS Server Choice Gets Tougher," *Network World*, 52 (May 23, 1994).

(List continued on next page.)

*Primary Examiner*—Mark H. Rinehart
*Attorney, Agent, or Firm*—Leydig, Voit & Mayer, Ltd

[57] ABSTRACT

The on-line network access system of the present invention operates as an extension of a computer's operating system to provide a graphical interface which displays the offerings available in the on-line network. The organization of the offerings are displayed in a manner which is visually similar to the way the operating system displays the organization of the computer's local file system. Using multiple navigators, the system displays different user interfaces which correspond to different offerings on the on-line network. The system further provides a content map which illustrates the location of a user in the on-line network. In addition, the system creates "shortcuts" which allow users of the on-line network to reference particular locations in the on-line network. A unique shortcut data structure allows the storage of the shortcuts in the user's computer or the transfer of the shortcuts to others.

35 Claims, 25 Drawing Sheets

U.S. PATENT DOCUMENTS

| | | |
|---|---|---|
| 4,799,156 | 1/1989 | Shavit et al. . |
| 4,800,488 | 1/1989 | Agrawal et al. . |
| 4,858,117 | 8/1989 | DiChiara . |
| 4,899,136 | 2/1990 | Beard et al. . |
| 4,914,571 | 4/1990 | Baratz et al. . |
| 5,079,765 | 1/1992 | Nakamura . |
| 5,113,499 | 5/1992 | Ankney . |
| 5,140,689 | 8/1992 | Kobayohi . |
| 5,151,989 | 9/1992 | Johnson et al. . |
| 5,187,790 | 2/1993 | Fast et al. . |
| 5,247,676 | 9/1993 | Ozur et al. . |
| 5,257,369 | 10/1993 | Skeen et al. . |
| 5,265,250 | 11/1993 | Andrade et al. . |
| 5,291,597 | 3/1994 | Shorter et al. . |
| 5,307,490 | 4/1994 | Davidson et al. . |
| 5,321,841 | 6/1994 | East . |
| 5,329,619 | 7/1994 | Page et al. . |
| 5,341,477 | 8/1994 | Pitkin et al. . |
| 5,347,632 | 9/1994 | Filepp et al. . |
| 5,355,497 | 10/1994 | Cohen-Levy . |
| 5,367,621 | 11/1994 | Cohen et al. ............................ 395/154 |
| 5,371,852 | 12/1994 | Attanasio . |
| 5,388,255 | 2/1995 | Pytlik et al. . |
| 5,396,626 | 3/1995 | Nguyen . |
| 5,423,003 | 6/1995 | Berteau . |
| 5,434,994 | 7/1995 | Shaheen et al. . |
| 5,444,848 | 8/1995 | Johnson et al. . |
| 5,455,932 | 10/1995 | Major et al. . |
| 5,463,625 | 10/1995 | Yasrebi . |
| 5,473,599 | 12/1995 | Li et al. . |
| 5,475,819 | 12/1995 | Miller et al. . |
| 5,481,720 | 1/1996 | Loucks et al. . |
| 5,483,652 | 1/1996 | Sudama et al. . |
| 5,490,270 | 2/1996 | Devarakonda et al. . |
| 5,491,800 | 2/1996 | Goldsmith et al. . |
| 5,491,817 | 2/1996 | Gopal et al. . |
| 5,491,820 | 2/1996 | Belove et al. . |
| 5,497,463 | 3/1996 | Stein et al. . |
| 5,500,929 | 3/1996 | Dickinson . |
| 5,515,508 | 5/1996 | Pettus et al. . |
| 5,526,491 | 6/1996 | Wei . |
| 5,530,852 | 6/1996 | Meske, Jr. et al. ................ 395/200.48 |
| 5,544,313 | 8/1996 | Shachanai et al. . |
| 5,544,327 | 8/1996 | Dan et al. . |
| 5,548,724 | 8/1996 | Akizawa et al. . |
| 5,548,726 | 8/1996 | Pettus . |
| 5,553,239 | 9/1996 | Heath et al. . |
| 5,553,242 | 9/1996 | Russell et al. . |
| 5,559,969 | 9/1996 | Jennings . |
| 5,564,043 | 10/1996 | Siefert . |
| 5,572,643 | 11/1996 | Judson .................................... 395/793 |
| 5,581,753 | 12/1996 | Terry et al. . |
| 5,592,611 | 1/1997 | Midgely et al. . |
| 5,596,579 | 1/1997 | Yasrebi . |
| 5,596,744 | 1/1997 | Dao . |
| 5,608,865 | 3/1997 | Midgely et al. . |
| 5,608,903 | 3/1997 | Prasad et al. . |
| 5,617,568 | 4/1997 | Ault et al. . |
| 5,617,570 | 4/1997 | Russell et al. . |
| 5,619,632 | 4/1997 | Lamping et al. ....................... 395/141 |
| 5,650,994 | 7/1997 | Daley . |
| 5,666,519 | 9/1997 | Hayden . |
| 5,675,723 | 10/1997 | Ekrot et al. . |
| 5,675,796 | 10/1997 | Hodges et al. . |
| 5,774,668 | 6/1998 | Choquire et al. . |

OTHER PUBLICATIONS

International Telecommunication Union, *CCITT Blue Book vol. VIII Data Communication Networks Directory*, 3–18 (1989).

Pallatlo, John, "Sybase Lays Out Blue Print for Client/Server Networks," *PC Week*, vol. 9, No. 461, 6 (1992).

PR Newswire Association, Inc., "America On–line Publicly Previews World Wide Web Browser," *Financial News Section* (May 9, 1995).

Quereshi, "The Effect of Workload on the Performance and Availability of Voting Algorithms," *IEEE* (1995).

Rexford, Jennifer, "Window Consistent Replication for Real–Time Applications," *IEEE* (1994).

Richman, Dan, "Sybase to Enhance RDBMS," *Open System Today*, No. 111 (1992).

Silberschatz, et al., *Operating System Concepts, 4th Ed.*, 361–380,431–457 (1994).

Terry, Douglas, "Session Guarantees for Weekly Consistent Replicated Data," *IEEE* (1994).

Wang, Yongdong, Data Replication in a Distributed Heterogenous Database Environment, *IEEE* (1994).

*The User Interface and the Shell*, Chapter Five, Inside Windows 95, Adrian King, 1994.

*So . . . Just What Is This First Class Thing Anyway?*, http://orion.edmonds.wednet.edu/ESD /FC/AboutFC.html, down–loaded on Oct. 10, 1995.

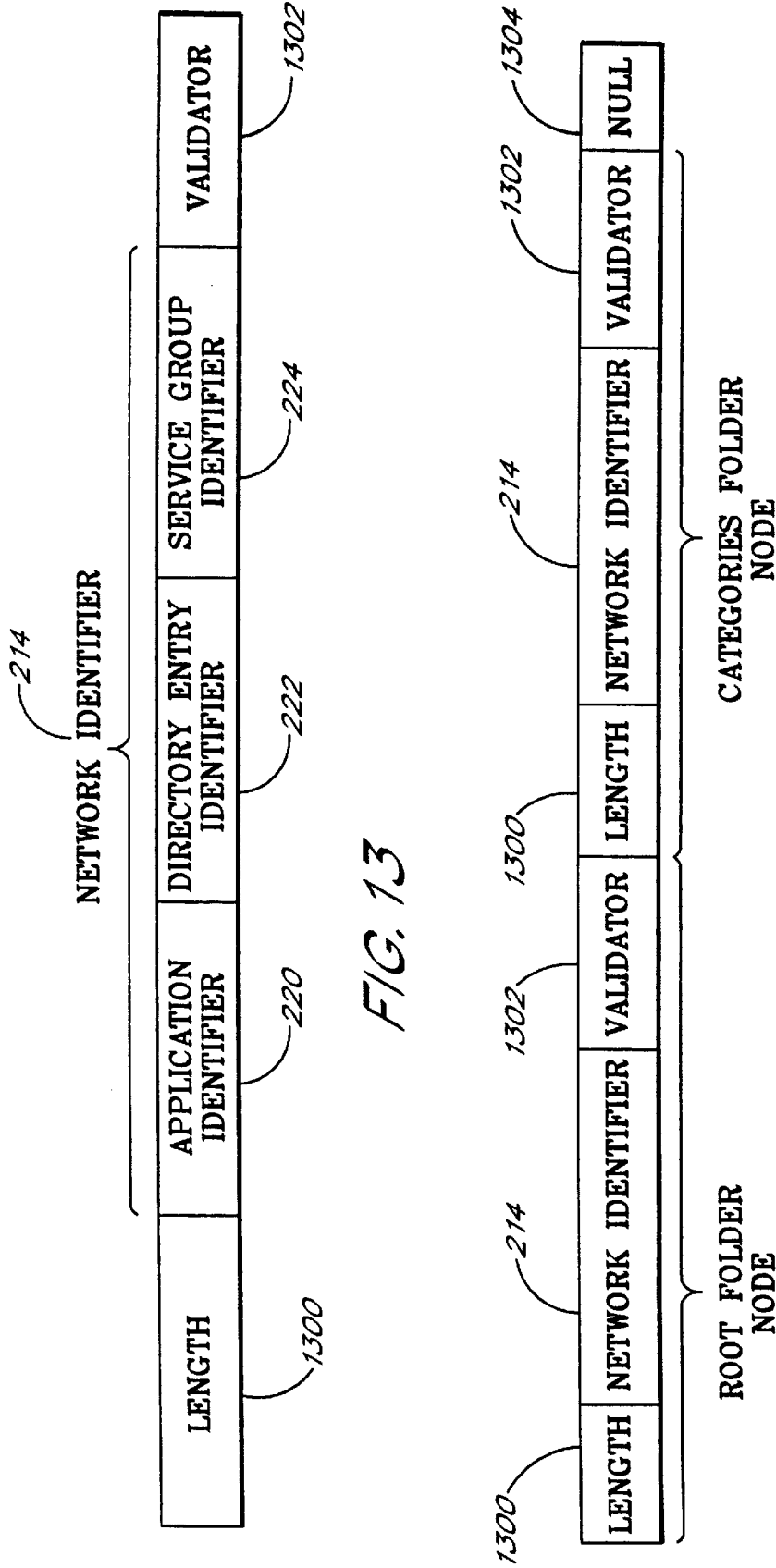

APPARATUS FOR PRESENTING THE CONTENT OF AN INTERACTIVE ON-LINE NETWORK

BACKGROUND OF THE INVENTION

1. Field of the Invention

This invention relates to on-line network communication systems and, more particularly, to a system for accessing an interactive on-line network to obtain information-related services.

2. Background

Various on-line networks are currently in existence, including Compuserve, Prodigy, and America On-Line. End users typically access these networks using a microcomputer equipped with a modem. During a logon session, the on-line network displays a user interface which helps guide the user to desired services. To view a particular service, the user must learn the sequence of input commands needed to locate and invoke the desired service.

For example, by entering the proper commands, a user can view a variety of information-related services and communications services, including news services, weather services, bulletin board services, electronic mail, and the like. The visual display created by the on-line network and the input commands which direct the on-line network to perform a desired action are typically called a user interface.

The software which implements a user interface is called a "shell." Thus, the shell is the set of software instructions that (1) create the visual display and (2) process a user's input commands. For example, a network shell provides the visual images and menus which a user sees when accessing an on-line network. Thus, the network shell is the software programming which provides a communication mechanism between the user and the on-line network.

Users of on-line systems spend a significant amount of time locating services, data files, and other information. Typically, a network shell attempts to reduce the amount of time a user spends locating information by providing a user interface which presents the on-line network's organizational structure in a familiar and intuitive manner. Thus, a network shell which is easy to use, familiar and flexible, greatly reduces the time it takes a user to locate resources in an on-line network.

Although known network shells for on-line networks offer many significant benefits, such network shells are still subject to a number of significant limitations. For example, existing network shells are not integrated with the user interface displayed by a local computer's operating system. Further, existing network shells do not adequately communicate the location of a user in the on-line network or provide a means for directly accessing a desired location or service in an on-line network.

In addition, conventional on-line network shells are monolithic. That is, the network shell provides the user interface for the entire network. Anytime the network shell is changed or updated, it affects the entire system. In very large on-line systems, this increases the cost of support, requires frequent network shell updates, and confuses users.

SUMMARY OF THE INVENTION

The present invention provides an enhanced on-line network access system which optimizes an on-line system's user interface. The on-line network access system of the present invention acts as an extension of the user's local operating system and is consistent, intuitive, and extensible.

As explained above, users of on-line systems spend a significant amount of time locating services, data files, and other information. Past systems, however, have not considered providing a network shell that is integrated with a user's operating system so as to provide a familiar user interface. The system of the present invention, operates as an extension of the local computer's operating system.

For example, in the preferred embodiment, the on-line network access system operates as an extension to the Win 95 Explorer a product developed by the Microsoft Corporation. The Win 95 Explorer is the part of the Win 95 operating system that provides the operating system user interface. Accordingly, the present invention communicates with the local computer's operating system to provide a graphical interface which displays the offerings in the on-line network as a hierarchy of folders which are visually similar to the way the operating system displays the folders stored in the computer's local file system.

The on-line network access system of the present invention comprises several component modules. In the preferred embodiment, the component modules of the on-line network access system include a computer shell module, a network shell module, and multiple navigator modules. The computer shell module is the user interface which appears on a user's computer. When a user runs an operating system on his local computer, the computer shell module provides a user interface which displays the files and programs stored on the user's computer.

It is common to allow a user to hierarchically organize information into a directory system which is visually presented as a group of "folders." A folder is an icon which looks much like a regular file folder. Functionally, a folder is used to hold a collection of items such as files, programs and documents. Folders also contain child folders that provide a hierarchical organization much like directories and subdirectories. Further, the computer shell module allows a user to structure the way the files and programs are stored.

In the on-line network of the preferred embodiment, there are three different types of nodes: folders, leaves and junction points. The on-line network folder nodes are like directories. Folder nodes reference other nodes and provide the hierarchical structure in the on-line network. Leaf nodes are nodes which do not reference other nodes and contain non-hierarchical information such a data files and executable programs. Junction point nodes are nodes which link one service area of the on-line network with another service area. Junction point nodes are the "glue" by which different service areas are connected to form the global on-line network.

Thus, the network shell module of the present invention provides a view of the on-line network as a group of folders similar to the group of folders which represent the user's local file system. This generalized folder approach provides a user with a consistent mechanism which allows browsing for folders located in his local computer or browsing for folders located on the on-line network. Users thus interact with the network shell module in a natural way because the on-line network simply appears as an extension of the user's local file system.

Furthermore, current network shells have not considered providing a content map which illustrates the location of a user in the on-line network. The content map of the present invention provides a simple and easy to understand hierarchical view of the offerings in the on-line network. Further, the content map shows the paths which a user can take to locate desired resources within the on-line network.

Another deficiency of current network shells, however, is that they do not contemplate the use of different navigator modules. That is, current network shell modules support a single user interface. A navigator module in the present invention provides a user interface which differs from the user interface provided by the network shell module. When invoked, one of the navigator modules takes control of the user interface and provides a different visual display or a different set of input commands and menus.

The system of the present invention, interacts with multiple navigator modules to provide different user interfaces for different service providers. Thus, a service provider can use an existing navigator module or develop its own navigator module to display different types of folders, menus, icons, visual images, etc. This allows a service provider to tailor its user interface to the service it provides.

For example, many companies currently provide product support services. These product support services already contain unique user interfaces or navigators that allow users to find information in product support databases. With the present invention, a service provider can develop a navigator module that displays the unique user interface that its clients have grown accustomed to.

In another aspect of the present invention, a system of accessing the proper navigator module for a given service provider is provided. When a user accesses a particular on-line service, the navigator module corresponding to the desired service is invoked. The proper navigator module then provides the unique user interface associated with that service provider.

In a further aspect of the invention "shortcuts" are provided which reside in a user's local computer. These shortcuts allow the user to reference particular locations in an on-line network and directly jump to that particular location when the user activates the shortcut. For example, a user may periodically wish to access a bulletin board on gardening. As explained in more detail below, the user selects the desired bulletin board icon and drags the icon to a folder in his local computer. The network shell module then creates a shortcut icon and places the icon in the selected folder in the user's local computer.

When the user wishes to access the gardening bulletin board, the user does not need to logon to the on-line network, input confusing jump commands to maneuver to the proper location and then invoke the gardening bulletin board service. Instead, when the user selects the shortcut icon located in his local computer, the network shell module automatically accesses the on-line network, automatically jumps to the proper location and automatically launches the gardening bulletin board service.

Furthermore, the present invention allows the creator of a shortcut to transfer or electronically mail the shortcut to others. This greatly improves the ease of maneuvering within the on-line network. For example, if a user created a chat room for his friends, he could electronically mail his friends a shortcut which allows his friends to immediately access the desired chat room. Additionally, a magazine service provider could electronically mail shortcuts to potential consumers which allow users of the on-line network to immediately access the magazine service.

BRIEF DESCRIPTION OF THE DRAWINGS

These and other aspects, advantages, and novel features of the invention will become apparent upon reading the following detailed description and upon reference to accompanying drawings in which:

FIG. 13 is a detailed block diagram of the data format used by a preferred embodiment of the present invention to represent a node in the on-line network;

FIG. 14 is a detailed block diagram illustrating an example of a network path created by a preferred embodiment to represent the path to a particular node in the on-line network;

Figure 1:
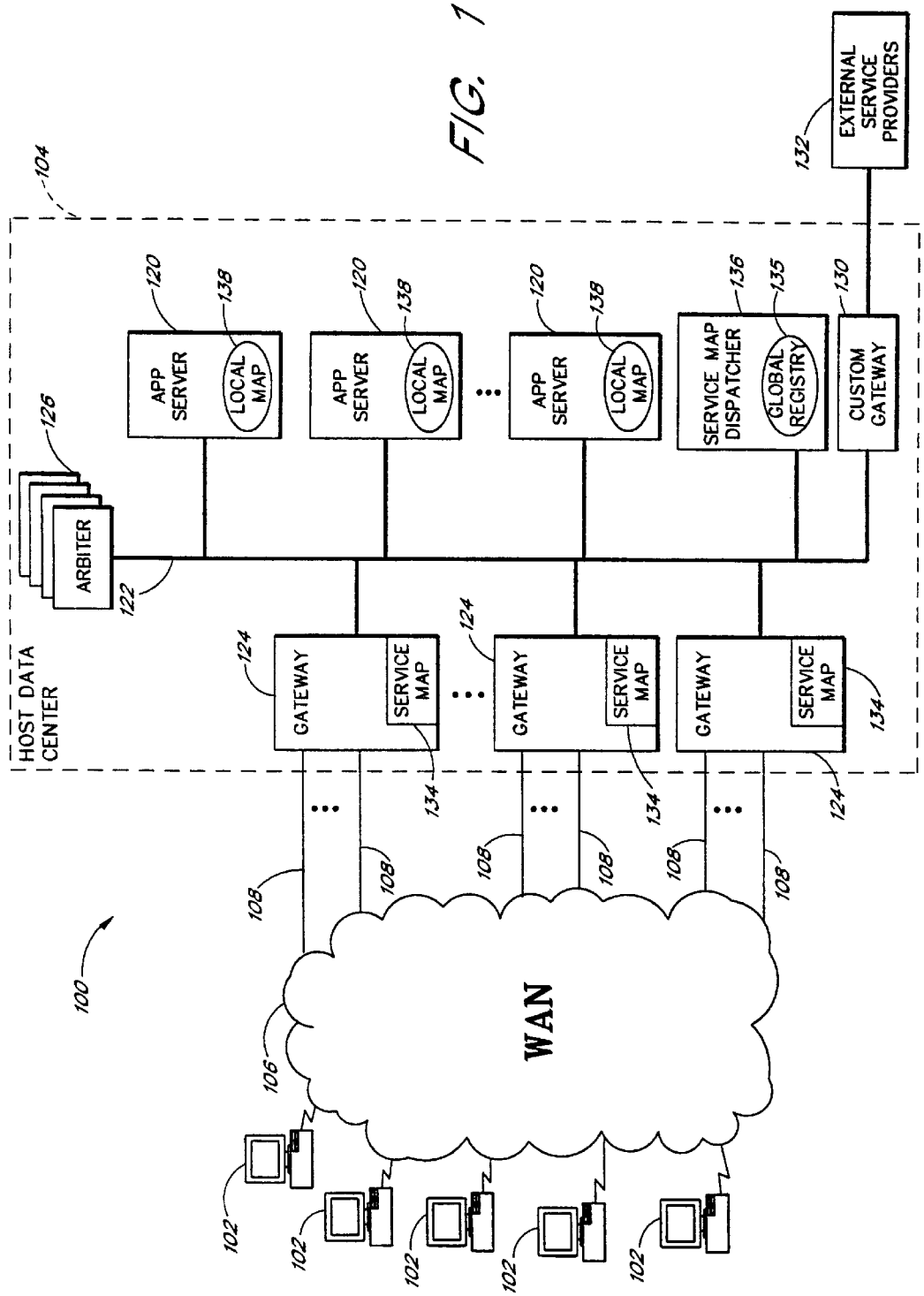
FIG. 1 is a high level drawing illustrating the architecture of an on-line services network in accordance with one embodiment of the invention.

In the drawings, the first digit of any three-digit number indicates the number of the figure in which the element first appears. For example, an element with the reference number 402 first appears in FIG. 4. Where four-digit reference numbers are used, the first two digits indicate the figure number.

DETAILED DESCRIPTION OF THE PREFERRED EMBODIMENTS

The detailed description which follows is broken up into the following sections: ARCHITECTURAL OVERVIEW, ORGANIZATION OF THE ON-LINE NETWORK CONTENT, THE NETWORK SHELL, and SHORTCUTS.

1. Architectural Overview

FIG. 1 is a high level drawing illustrating the architecture of an on-line network 100 in accordance with one embodiment of the invention. The on-line network 100 includes multiple local computers 102 connected to a host data center 104 by one or more wide area networks (WANs) 106. The wide area network 106 of the preferred embodiment includes wide area network (WAN) lines 108 which are provided by one or more telecommunications providers. The wide area network 106 allows users of the local computers 102, dispersed over a wide geographic area, to access the host data center 104 via a modem.

The host data center 104 comprises a plurality of servers 120 connected to a high speed local area network (LAN) 122. Also connected to the local area network 122 are multiple Gateways 124 linking incoming calls from end users to the servers 120. In the preferred embodiment, the servers 120 and the Gateways 124 are Pentium-class (or better) microcomputers which run the Windows NT operating system available from Microsoft Corporation.

The servers 120 typically have at least 128 MB of random-access memory (RAM) and at least 4 GB of disk space. Processing power may vary from server to server. For example, one server 120 may have four 100 Mhz processors, while another server 120 may have one 90 Mhz processor. Each Gateway 124 typically has at least 64 MB of RAM and at least 2 GB of disk space, and is capable of supporting approximately 1000 simultaneous users at T1 (1.544 Mbps) or greater data rates. The local area network 122 is preferably a 100 Mbps LAN based on the CDDI (Copper Distributed Data Interface) standard. The CDDI specification is a variant of the well-known ANSI Fiber Distributed Data Interface specification, but uses a single copper ring instead of a dual fiber ring.

The host data center 104 also includes multiple Arbiter microcomputers 126 (hereinafter referred to as "Arbiters") which monitor, record and process certain types of transactions to ensure consistency among servers 120. The host data center 104 also includes one or more custom Gateway microcomputers 130 which link the host data center 104 to one or more external service providers 132, such as a news provider, a stock quote service or a credit card service which validates and executes credit card transactions. Each custom Gateway microcomputer 130 uses the communications protocol required by the external service provider 132 to which the custom Gateway is linked.

During a typical logon session, a client user maintains a communications link with a single Gateway 124, but may access multiple service applications (and thus communicate with multiple servers 120). The Gateway performs protocol translation, translating messages between the protocol of the wide area network 106 and the protocol of the local area network 122 and establishes links between a local computer 102 and a particular server 120.

The host data center 104 provides a variety of communications-based and information-based on-line services to client users. Typical services include, for example, a directory service, a bulletin board service, an electronic mail service, a chat service, a media view service, an interactive game service and various news services.

The directory service (also called the DirSrv service) provides a hierarchical data structure of the on-line network content. The bulletin board service (BBS) allows users to post and review bulletins on specific topics. With the bulletin board service, users conduct non-real-time conversations by posting messages to different bulletin boards. The electronic mail service allows users to send electronic mail messages to one another. The chat service allows users to communicate in real time with one another on specific topics. The mediaview service provides users with a service for viewing on-line multimedia titles. The interactive games service allows users to compete against one another in real time in on-line interactive games, and the news services provides access to news and magazine articles.

The services offered to users of the on-line network 100 are in the form of client-server application programs. The client applications execute on the users local computer while the service applications execute on one or more of the servers. In the presently preferred embodiment, the client applications are implemented as Win 95 executables and the server portions are implemented as dynamic link libraries which execute under the Microsoft Windows NT operating system.

2. Organization Of The On-line Network Content

Figure 2:
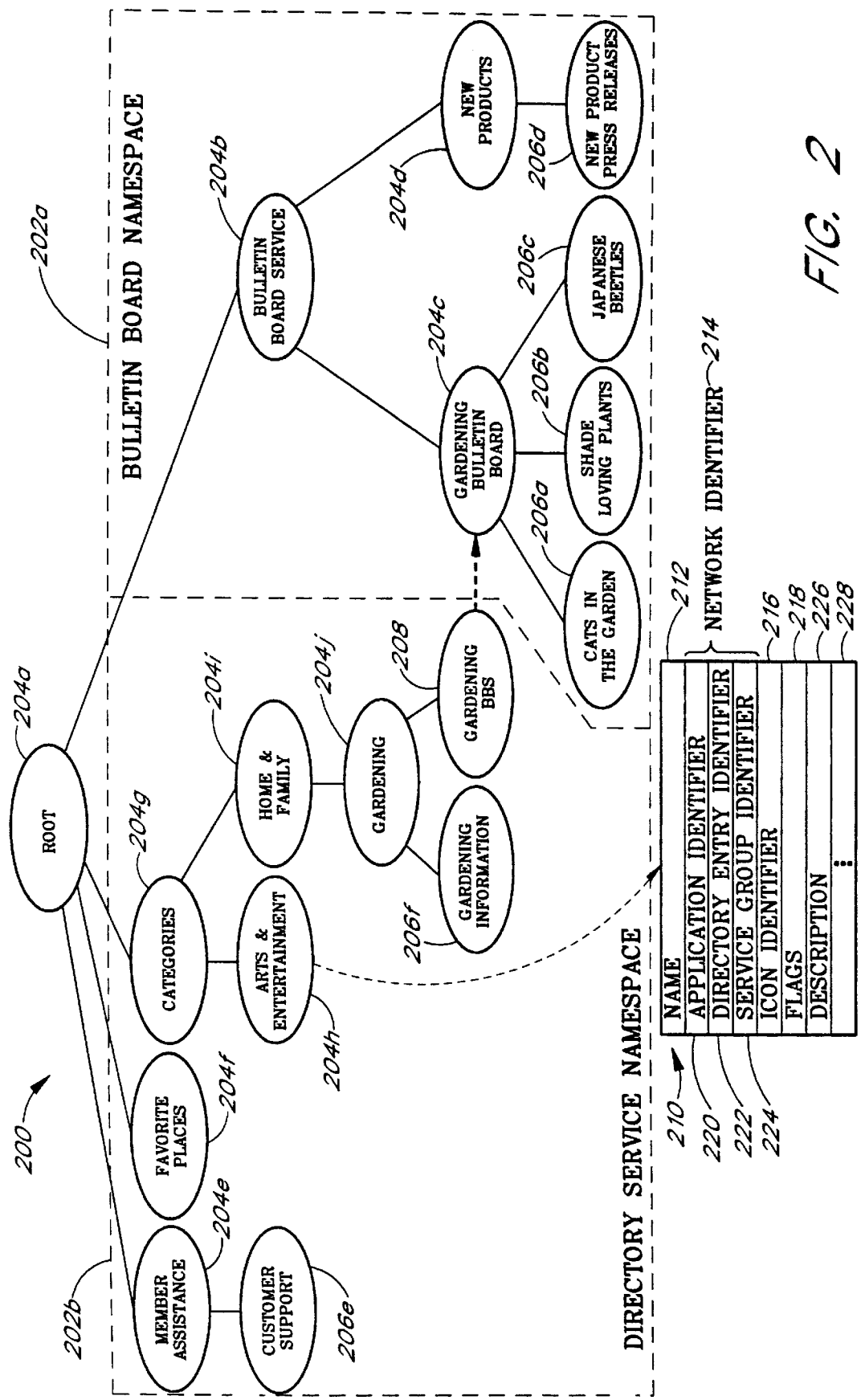
FIG. 2 is a block diagram illustrating one embodiment of the nodal data structure existing in the on-line network accessed by the present invention.

Referring to FIG. 2, the on-line network is organized into a hierarchical data structure 200 similar to a hierarchical tree. Each item in the structure is referred to as a "node." In the preferred embodiment, the hierarchical data structure is an acyclic graph which allows the linking of nodes on one branch of the hierarchical tree to reference nodes on other branches of the hierarchical tree.

In the preferred embodiment, the hierarchical data structure 200 is called a global namespace 200. The global namespace 200 is a network abstraction layer which hides the hardware-dependent details such as the gateways 124, the arbiters 126 and the servers 120 which comprise the on-line network 100. The global namespace 200 is further subdivided into different subsections called directory service provider namespaces 202 (hereinafter called "service namespaces 202"). In this example, the global namespace 200 is subdivided into two service namespaces—a bulletin board namespace 202a and a directory service namespace 202b.

In one embodiment of the present invention, as discussed in more detail below, each service namespace 202 corresponds to a service group. Furthermore, each service namespace 202 contains a portion of the hierarchial structure of nodes for its service group. Thus, in this example, the bulletin board namespace 202a contains the nodes associated with the bulletin board service (also called the BBS service group) and the directory service namespace 202b contains the nodes associated with the directory service (also called the DirSrv service group).

A service namespace 202 contains three different types of nodes—folder nodes 204, leaf nodes 206 and junction point nodes 208. Folder nodes 204 are like directories. Folder nodes 204 provide the hierarchical structure in a service namespace 202 because folder nodes reference other nodes. Leaf nodes 206 do not reference other nodes and contain non-hierarchical information such as executable programs and data files. Junction point nodes 208 link one service namespace 202 with another service namespace 202. Junction point nodes 208 are the "glue" by which different service namespaces 202 are connected to form the global namespace 200.

As explained above, the bulletin board service allows users to post and review messages on different bulletin boards. In this example, bulletin boards and groups of related bulletin boards are referenced by folder nodes 204. The bulletin board namespace 202a illustrated in FIG. 2 contains a bulletin board service folder node 204b, a gardening folder node 204c and a new products folder node 204d.

Leaf nodes 206 do not reference other nodes and in this example, different bulletin messages are represented as leaf nodes 206 in the bulletin board service namespace. In this example, the gardening bulletin board folder node 204c contains three messages, a "cats in the garden" leaf node 206a, a "shade loving plants" leaf node 206b and a "japanese beetles" leaf node 206c. The new products folder node 204d contains a single message, a "new product press release" leaf node 206d.

The directory service namespace 202b, in one embodiment of the on-line network 100, contains the on-line information content that is not within the bulletin board namespace 202a. The directory service namespace 202b organizes the information content with folder nodes 204. In this example, the directory service namespace 202b contains a member assistance folder node 204e, a favorite places folder node 204f and a categories folder node 204g. The categories folder node 204g references an arts and entertainment folder node 204h and a home and family folder node 204i. The home and family folder node 204i references a gardening folder node 204j.

The directory service namespace 202b in one embodiment of the present invention, stores programs, documents and images as leaf nodes 206. In this example, the member assistance folder node 204e references a customer support leaf node 206e which contains a document about customer support information. The gardening folder node 204j contains a gardening information leaf node 206g. As discussed in more detail below, the gardening folder node 204j also contains a gardening bulletin board junction point node 208.

In addition to the folder nodes 204 and leaf nodes 206, the directory service namespace 202b is linked to the bulletin board namespace 202a via the gardening bulletin board junction point node 208. As explained above, junction point nodes 208 link one service namespace with another service namespace. In this example, the gardening bulletin board junction point node 208 links the gardening folder node 204j to the gardening bulletin board 204c. Thus a user accessing information about gardens can easily access a bulletin board which discusses various gardening techniques.

In the preferred embodiment, each node 204, 206, and 208 contains a set of node properties 210. The set of node properties 210 contain the node's name 212, a network identifier 214, an icon identifier 216, flags 218 and a description 226 and other items 228. The node's name 212 is a human readable name that may be displayed with the node's corresponding icon such as the "gardening" name in the gardening folder node 204j.

The network identifier 214 is a 128-bit number which comprises an application identifier 220, a directory entry identifier 222 and a service group identifier 224. The application identifier 220 is a 32-bit number which identifies a particular service namespace 202. Thus, in the preferred embodiment of the present invention, the application identifier 220 uniquely identifies up to approximately four billion ($2^{32}$) service namespaces 202.

Currently three application identifiers 220 are assigned to particular namespaces 202. The following table describes the defined meaning of the three application identifiers in the preferred embodiment.

TABLE 1

| APPLICATION IDENTIFIER | DEFINED MEANING |
|---|---|
| 0x0001 | Directory Service Namespace |
| 0x0002 | Bulletin Board Namespace |
| 0x0003 | Root Node |

The directory entry identifier 222 is a 64-bit number which uniquely identifies each node in a particular service namespace 202. Thus, the directory entry identifier 222 of the present invention advantageously identifies up to approximately 18 billion, billion ($2^{64}$) nodes within a service namespace 202. The service group identifier 224 is a 16-bit number which advantageously identifies a group of servers.

The icon identifier 216 identifies the icon image or bit-map associated with each node. The flags 218 identify whether the node is a folder node, a leaf node or a junction point node. The description 226 contains a description of the node and contains up to 255 characters. The other items 228 include a security token, strings, and other properties that a service provider can define. Thus, in addition to providing the set of properties 210 listed above, the present invention allows service providers to create their own node properties.

3. The Network Shell

The global namespace 200 in the on-line network 100 will become an enormous hierarchical data structure. In addition, as discussed in more detail below, each service namespace 202 within the global namespace 200 has the ability to grow into a very large hierarchical data structure. As a result, the network shell needs to provide a simple, intuitive and extensible user interface which assists a user as he maneuvers about the on-line network.

Figure 3:
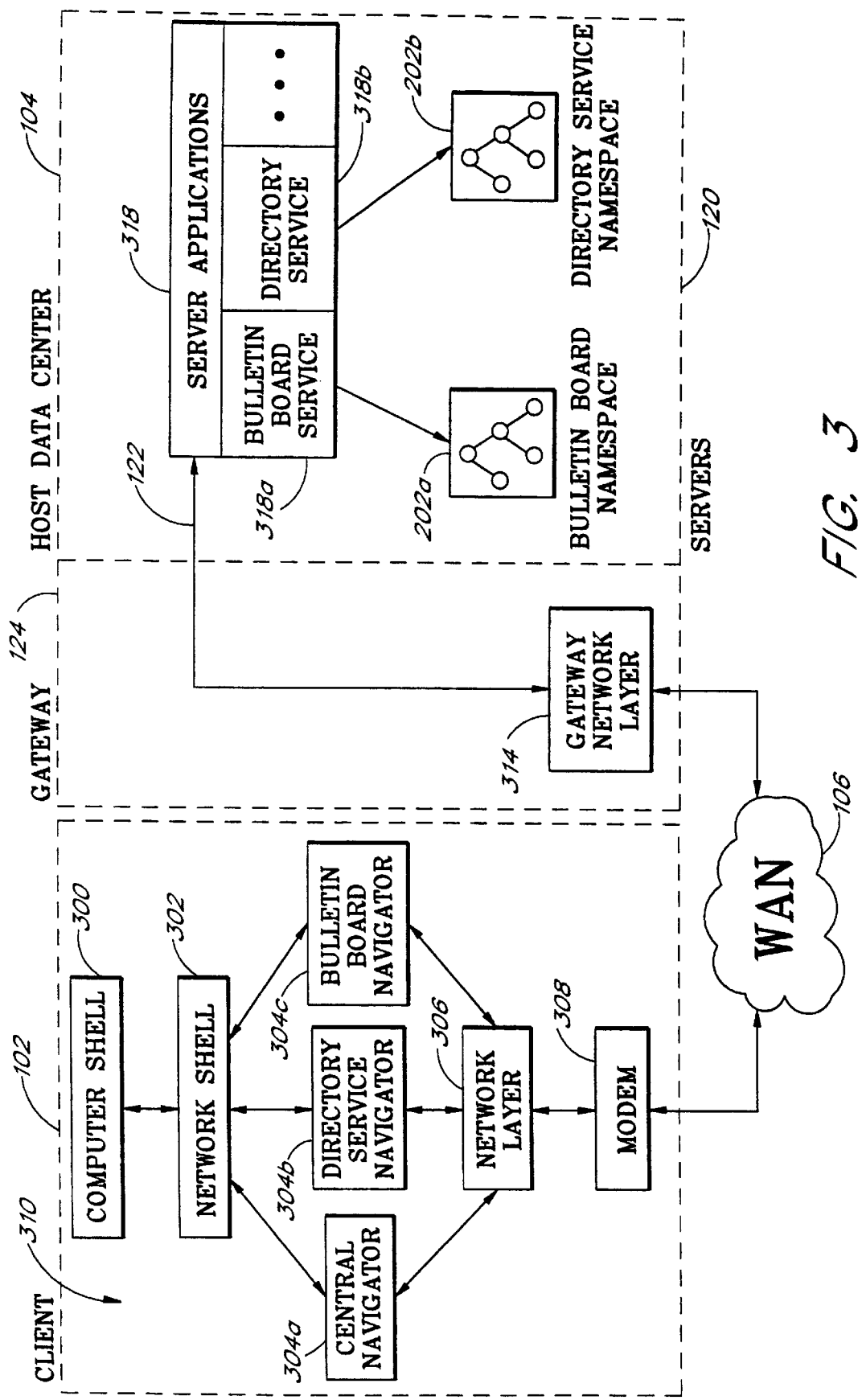
FIG. 3 is a high-level block diagram illustrating the architecture of a preferred embodiment of the present invention.

FIG. 3 illustrates a block diagram of the on-line network access system in a preferred embodiment of the present invention. The present invention generally contains multiple modular components including a computer shell module 300, a network shell module 302, and one or more navigator modules 304 which communicate with server applications 318 on the on-line network 100. As explained in more detail below, these modules interact to provide a flexible and extensible system for browsing the on-line network 100.

The services offered by the on-line network 100 are in the form of client-server application programs. Each client-server application includes a client application 310 and a server application 318. In the presently preferred embodiment, the client application 310 runs on the local computer 102 and includes the computer shell module 300, the network shell module 302, and one or more navigator modules 304 which are in communication with the server applications 318 existing on the servers 120. In this example, the server applications 318 include the bulletin board service 318a and the directory service 318b.

In the present invention, a network layer 306 in the client processor 102 manages the communications between the client application 310 and the server applications 318. The network layer 306 in the local computer 102 communicates via a modem 308 over the wide area network 106 with the host data center 104. A gateway network layer 314 exists on each gateway 124 which interfaces with the wide area network 106. The gateway 124, in turn, establishes communication links with desired server applications 318 via the local area network 122. A person skilled in the art can appreciate that the network layer 306 and the gateway network layer 314 can be implemented using any number of different protocols and computer configurations without departing from the scope of the present invention.

Turning now to the modular components in the client application 310 of the present invention, the computer shell module 300 (hereinafter referred to as the computer shell 300) provides the user with a means of control over his own computer. The user can use the computer shell 300 to direct his local computer 102 to locate files, invoke programs and the like. In the preferred embodiment, the computer shell 300 is the Microsoft Win 95 Explorer.

Figure 4:
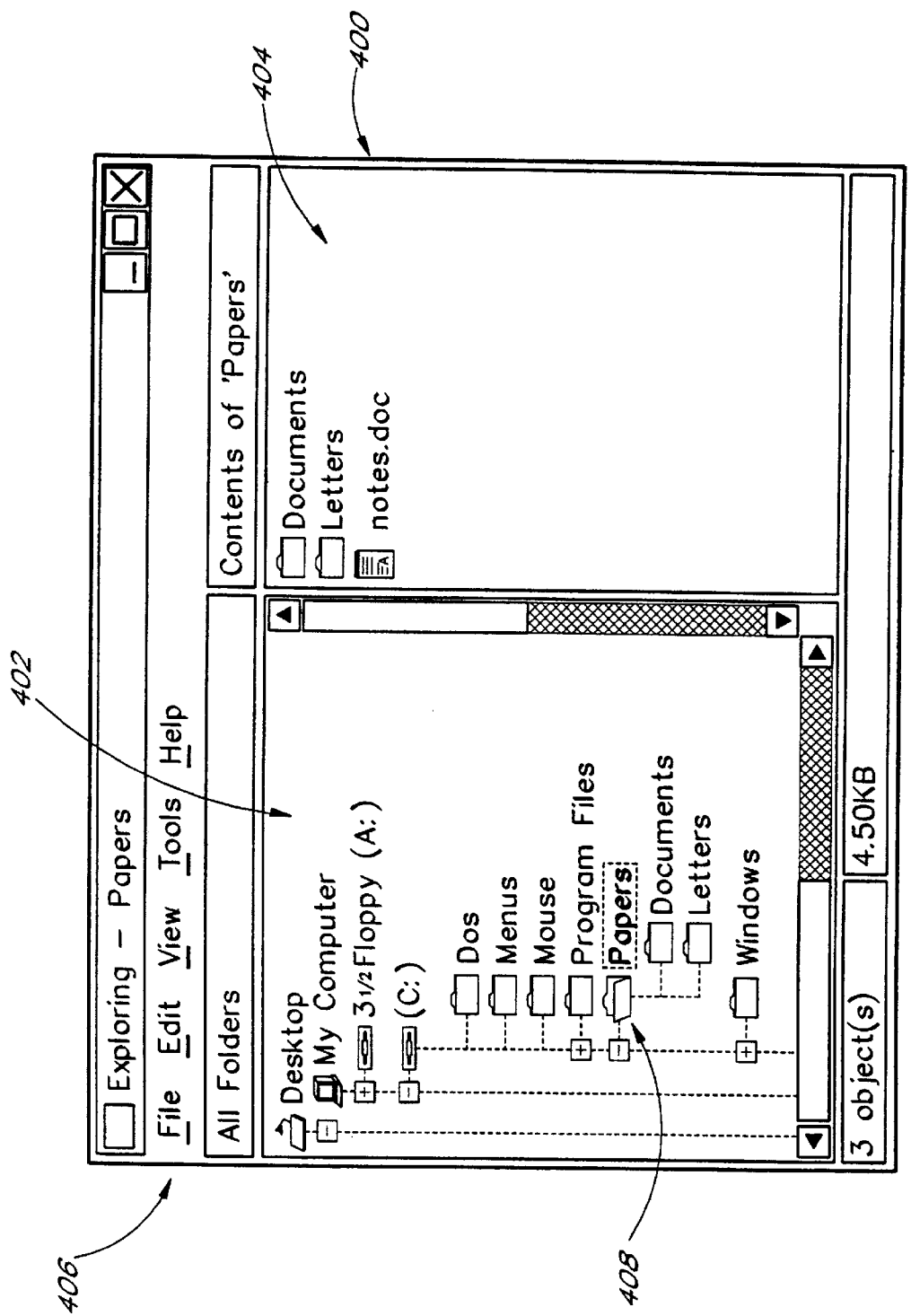
FIG. 4 is a diagram illustrating the graphical user interface created by the Win 95 Explorer.

FIG. 4 illustrates the user interface created by the Win 95 explorer. The Win 95 explorer displays a two-pane window 400. The left pane 402 contains a hierarchical map which displays the storage devices and folders in a user's computer. The right pane 404 contains the contents of a selected folder. In addition, the Win 95 explorer contains a command menu 406. The Win 95 explorer is further described in *Inside Windows* 95, Microsoft Press, 1994, which is hereby incorporated by reference.

For example, in FIG. 4, the left pane indicates that the user has selected the papers folder 408 (the folder is highlighted and appears to be open) and the right pane displays the contents of the papers folder. In this example, the left pane 402 of the Win 95 Explorer shows that the papers folder is located on the C: drive in the user's local computer (called My Computer in this example). The right pane 404 indicates that the papers folder contains a documents folder and a letters folder. In addition, the papers folder also contains a document called "notes.doc."

As described in more detail below, a user can select the on-line network 100 from within the computer shell 300. Selection of the on-line network 100 could include, for example, selection of an on-line network icon, selection of the on-line network 100 via a menu, the input of a textual command, voice input, etc. In the present invention, when the user selects the on-line network 100, the computer shell 300 generates an on-line network globally unique identifier. In the preferred embodiment, the globally unique identifier is the network identifier 214 for the root folder node 204a of the on-line network 100.

The computer shell 300 sends the root folder node network identifier 214 to an Object Linking and Embedding module (not shown) which invokes the network shell module 302. The Object Linking and Embedding module (version 2.0) is defined by Microsoft Corporation and is well known in the art and is further described in *OLE 2 Programmer's Reference Vol. I*, Microsoft Press, 1993, *OLE 2 Programmer's Reference Vol. II*, Microsoft Press, 1993 and Brockschmidt, *Inside OLE* 2, Microsoft Press, 1994 which are hereby incorporated by reference. In response to the network identifier 214, the Object Linking and Embedding module loads the network shell module 302.

The network shell module 302 (hereinafter referred to as the network shell 302) controls the communications between the computer shell 300 and one or more navigator modules 304. As explained in more detail below, the network shell 302 preferably exists in a dynamic link library. The network shell 302 identifies the appropriate navigator module 304, invokes the identified navigator module 304 and directs the navigator module 304 to perform specific tasks.

In addition, the network shell 302 converts nodal data received from the on-line network 100 into a format recognizable by the computer shell 300. Furthermore, the network shell 302 locates and invokes executable programs when the user selects a leaf node 206 in the on-line network 100.

Figure 5:
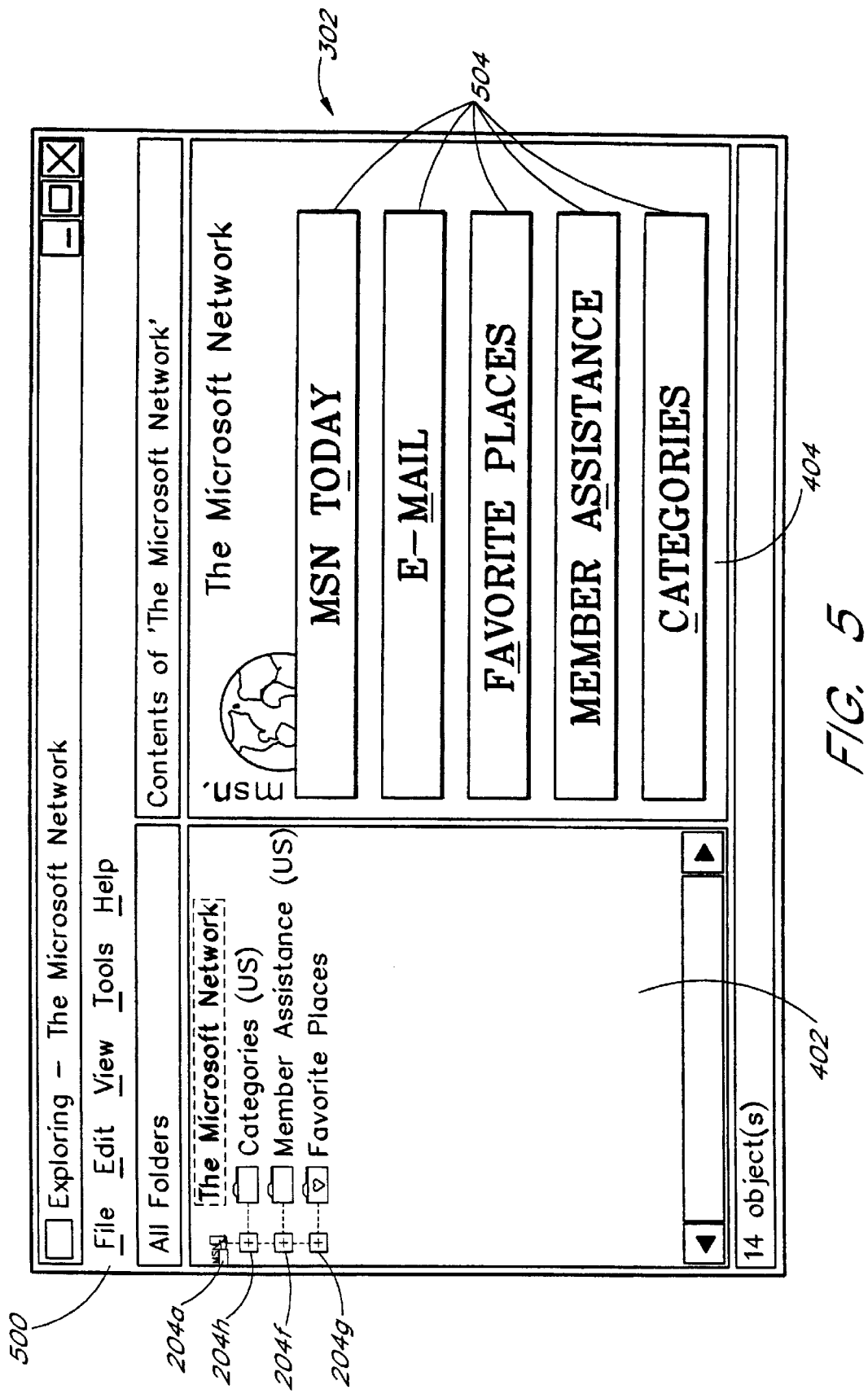
FIG. 5 is a diagram illustrating one embodiment of the graphical user interface created by the central navigator module in a preferred embodiment of the present invention.

As illustrated in FIG. 5, the network shell 302 of the preferred embodiment acts as an extension of the Win 95 explorer. Thus, in one embodiment, the network shell 302 obtains the on-line nodal information necessary to present a hierarchial view of the on-line network in the left pane 402 and the contents of a selected folder node 204 in the right pane 404. For example, in FIG. 5 the left pane 402 indicates that a user has selected the on-line network root folder node 204a (the folder node is highlighted in the left pane 402). In the right pane 404, the central navigator module 304a, as described in more detail below, displays the contents of the on-line network root folder node 204a.

The left pane 402 contains a hierarchical map of the user's location in the on-line network. In this example, the left pane 402 shows that the root folder node 204a contains three children folder nodes—a categories folder node 204g, a member assistance folder node 204e, and a favorite places folder node 204f. Further, the network shell 302 contains a similar command menu 500.

Because the network shell 302 provides a graphical interface similar to the computer shell 300, a user who is familiar with the computer shell 300 does not need to spend time learning a new interface. The network shell 302 of the present invention also allows a user to easily browse and explore the on-line network 100 with the hierarchical map provided in the left pane window 402.

The next module of the present invention includes one or more navigator modules 304 (hereinafter referred to as navigators 304). In the presently preferred embodiment, the on-line network access system contains a central navigator 304a, a directory service navigator 304b and a bulletin board navigator 304c. FIGS. 3, and 5–10, illustrate different embodiments of the central navigator 304a, the directory service navigator 304b and the bulletin board navigator 304c.

A navigator 304 is the software which (1) provides a user interface and (2) communicates with a data source such as the on-line network 100. Thus, a navigator 304 is the software which displays certain menu commands or toolbars, certain kinds of icon formats, etc. In addition that navigator 304 communicates with a data source to obtain information such as nodal information from the on-line network 100. Because many types of user interfaces currently exist, the present invention provides a unique architecture which allows different navigators 304 on an on-line network 100 to display different user interfaces.

Referring to FIG. 5, the image created in the right pane 404 of the network shell 302 was created with the central navigator 304a. In this example, the central navigator 304a displays a home page for users of the on-line network 100.

This home page is very simple and allows the user to begin browsing the on-line network 100 by selecting one of five different icon buttons 502.

Figure 6:
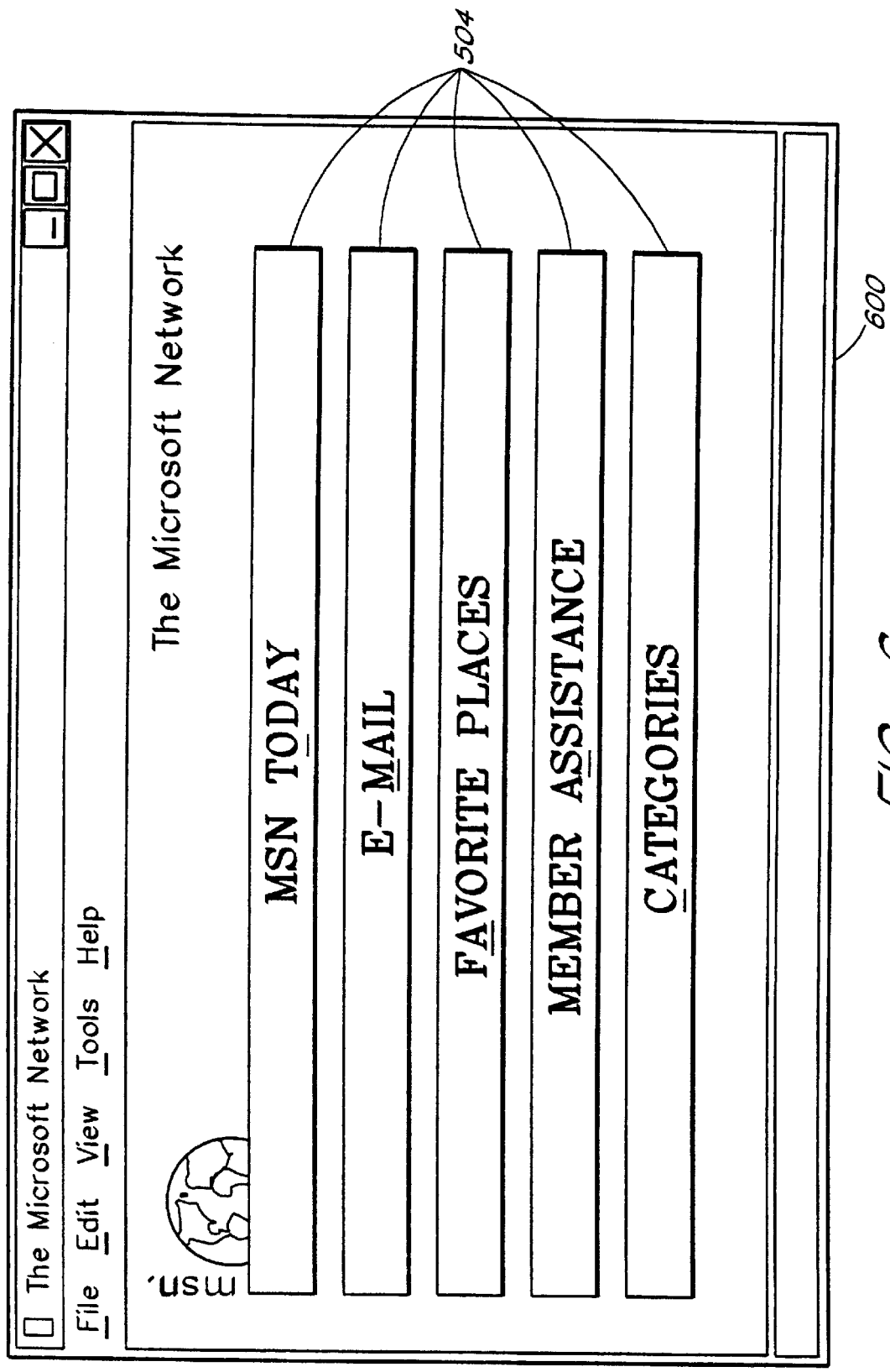
FIG. 6 is a diagram illustrating another embodiment of the graphical user interface created by the central navigator module in a preferred embodiment of the present invention.

Referring now to FIG. 6, another embodiment of the network shell 302 replaces the two-pane window with a single pane window 600 which does not display the hierarchical location of user in the on-line network. Rather, than showing the hierarchical structure of the network, the single pane window 600 only displays the images generated by the central navigator 304a.

If the user selects the categories icon button 502, the user moves to the categories folder node 204g. In this example, the categories folder node 204g exists in the directory service namespace 202b. As explained below, the network shell 302 identifies that the categories folder node 204g exists in the directory service namespace 202b and consequently invokes the directory service navigator 304b. The directory service navigator 304b then creates the images which comprise the directory service user interface.

Figure 7:
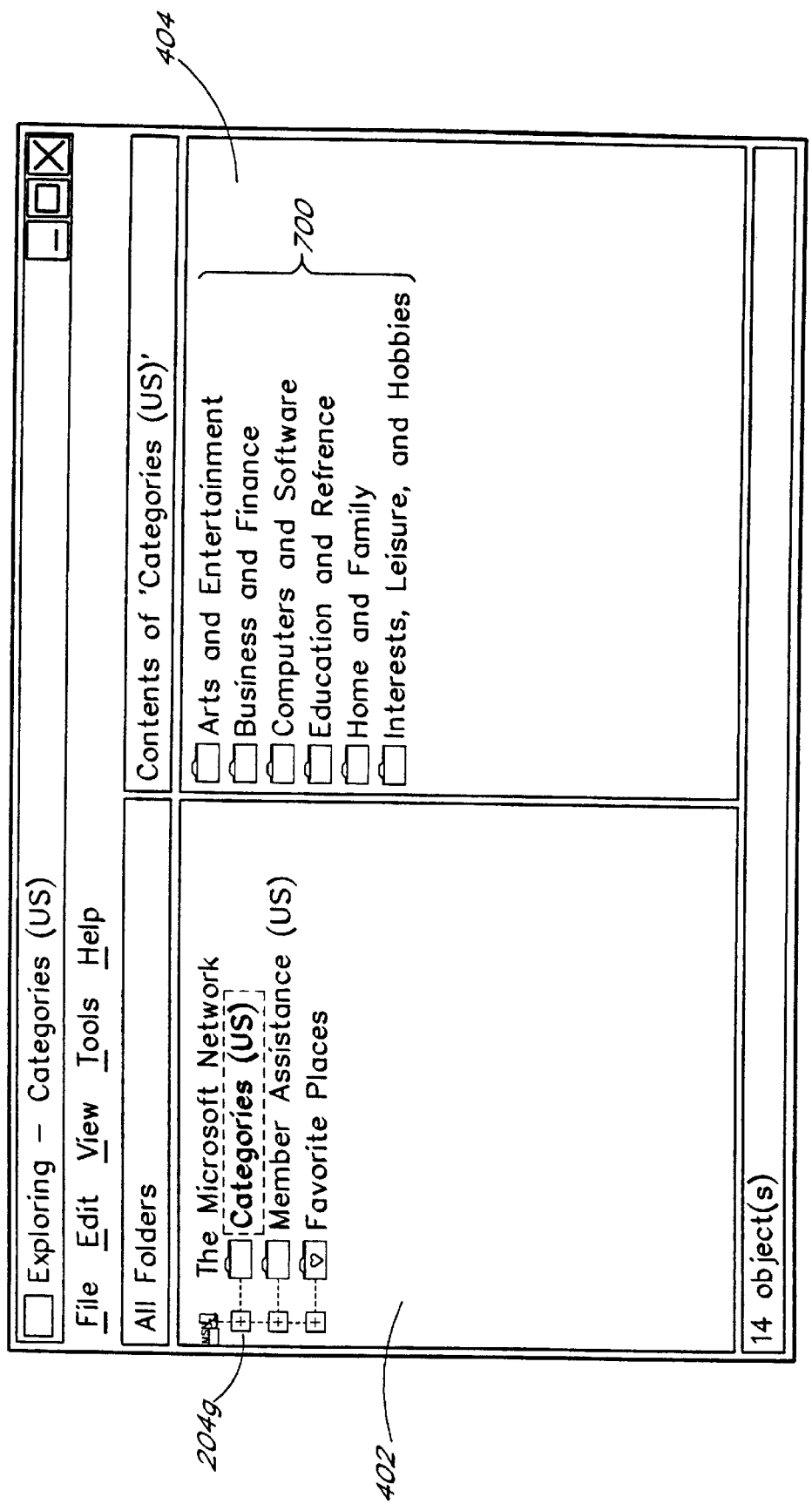
FIG. 7 is a diagram illustrating one embodiment of the graphical user interface created by the directory service navigator module in a preferred embodiment of the present invention.

Referring to FIG. 7, the user interface created by the network shell 302 and the directory service navigator 304b is shown. In the left pane 402, the content map shows that the user has selected the categories folder node 204g (the categories folder node 204g is highlighted). In the right pane 404, the directory service navigator 304b displays the contents of the categories folder node 204g as children folders 700. Thus the directory service navigator 304b tailors the display of on-line service nodes to present a user interface which allows a user to easily browse the content of the on-line network 100.

Figure 8:
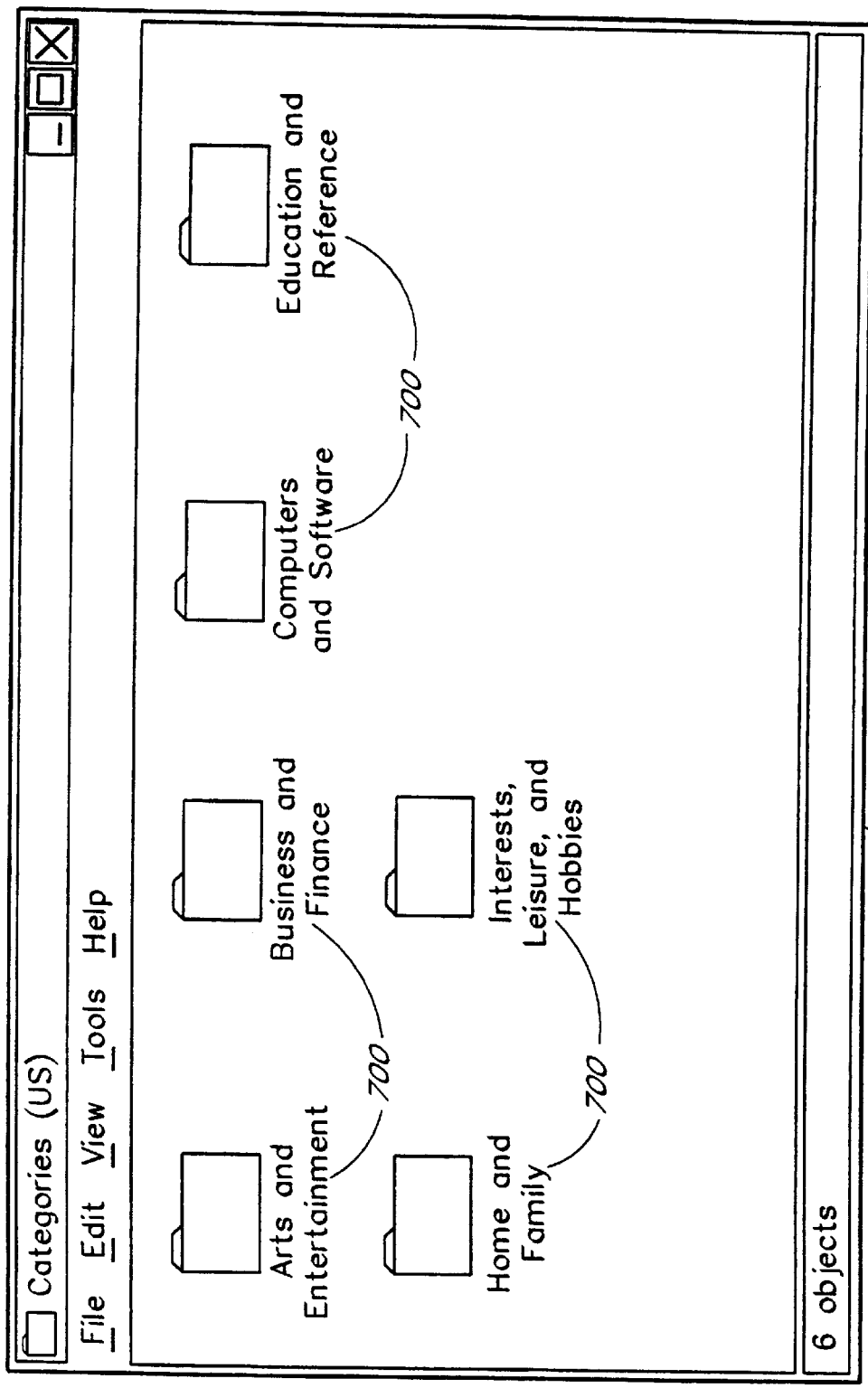
FIG. 8 is a diagram illustrating another embodiment of the graphical user interface created by the directory service navigator module in a preferred embodiment of the present invention.

Referring now to FIG. 8, in another embodiment, the network shell 302 replaces the two-pane window with a single pane window 800 which does not display the hierarchical location of the user in the on-line network. Rather, than showing the hierarchical structure of the on-line network 100, the single pane window 800 only displays the images created by the directory service navigator 304b. In this example, the directory service navigator 304b displays the children nodes of the category folder node 204 as children folders 700 which a user can select to obtain additional information.

Figure 9:
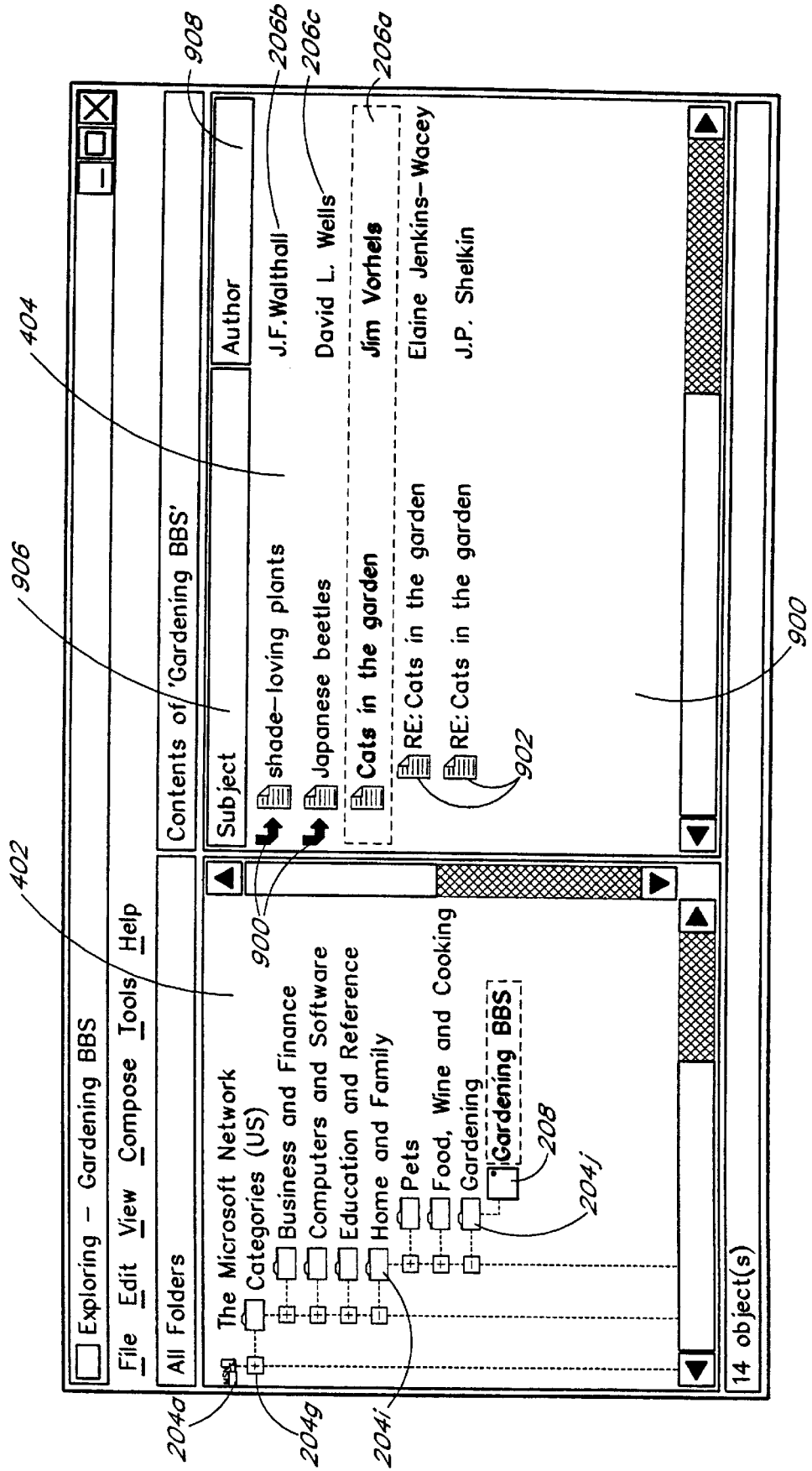
FIG. 9 is a diagram illustrating one embodiment of the graphical user interface created by the bulletin board navigator module in a preferred embodiment of the present invention.

Referring to FIG. 9, the user interface created by the network shell 302 and the bulletin board navigator 304c is shown. In this example, the content map in the left pane 402 shows that the user has selected the gardening bulletin board junction node 208. As the hierarchy map shows, the path to the gardening bulletin board starts at the root folder node 204a, proceeds to the categories folder node 204g, the home and family folder node 204i, the gardening folder node 204j and the gardening bulletin board junction point node 208.

In this example, the gardening bulletin board 204c exists in the bulletin board namespace 202a. As discussed in more detail below, the network shell 302 identifies that the garden bulletin board 204c exists in the bulletin board namespace 202a and consequently invokes the bulletin board navigator 304c. The bulletin board navigator 304 creates the images in the right pane 404 which comprise the bulletin board service user interface.

For example, the gardening bulletin board 204c contains a number of leaf nodes 206 relating to certain topics. In this example, the gardening bulletin board contains the shade loving plants leaf node 206b, the japanese beetles leaf node 206c and the cats in the garden leaf node 206a, etc. The bulletin board navigator 304c, however, displays the topics and comments about specific topics in a different format than the central navigator 304a or the directory service navigator 304b.

In this example, the bulletin board navigator 304c shows bold arrows 900 next to the comments that a user has not viewed. If a user has viewed a topic, the bulletin board navigator 304c removes the bolded arrow 900. In this example, the user has read the cats in the garden leaf node 206a. Further, responses 902 to a particular topic are shown indented. In addition, the bulletin board navigator 304c displays a tool bar 904 which shows the subject 906 of a message and the author 908 of a message. Thus, the bulletin board navigator 304c tailors the user interface to display a format which optimizes the viewing of bulletin board messages.

Figure 10:
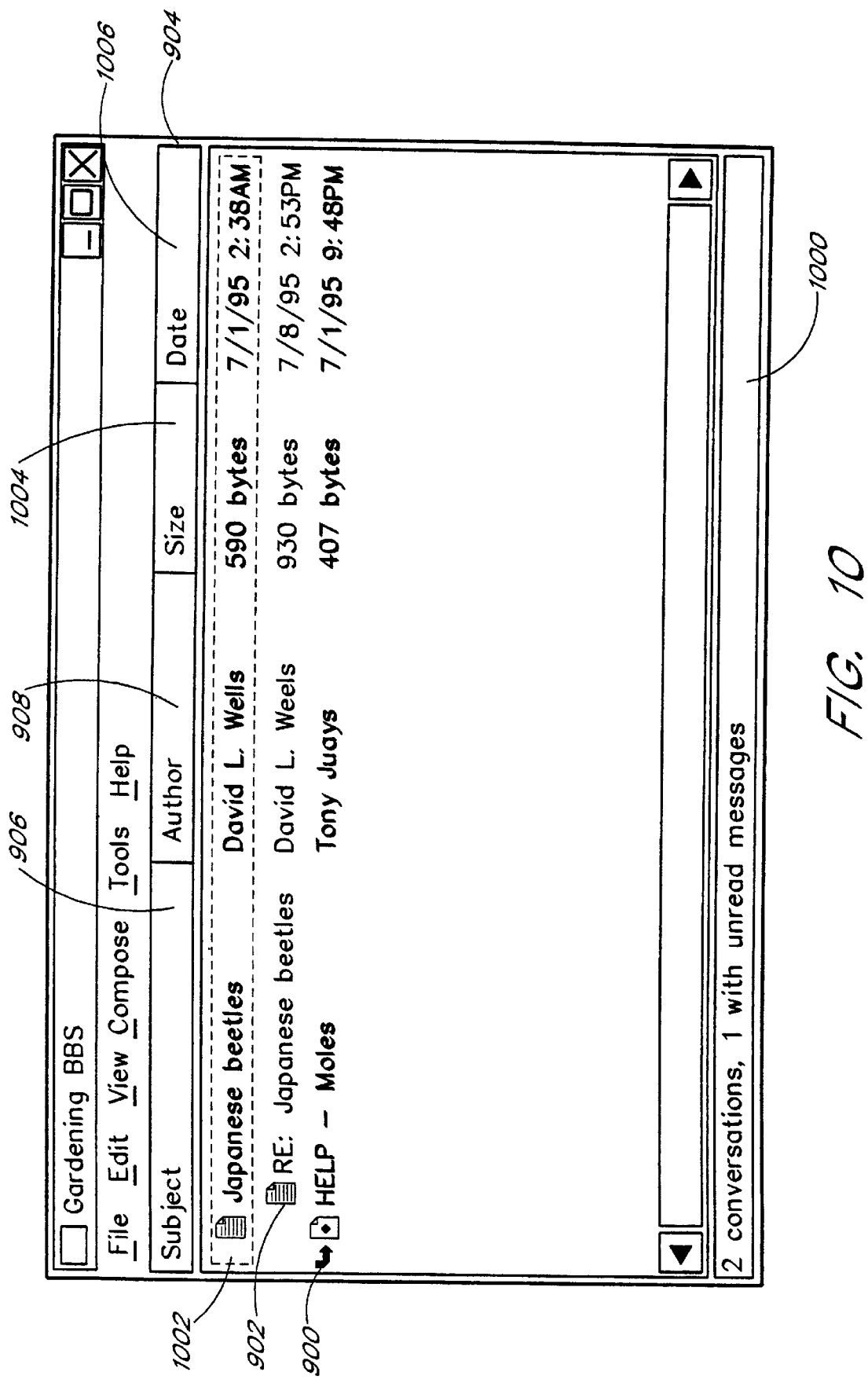
FIG. 10 is a diagram illustrating another embodiment of the graphical user interface created by the bulletin board navigator module in a preferred embodiment of the present invention.

Referring now to FIG. 10, in another embodiment, the network shell 302 replaces the two-pane window with a single pane window 1000 which does not display the hierarchical location of user in the on-line network 100. Rather, than showing the hierarchical structure of the on-line network 100, the window simply displays the images created by the bulletin board service navigator 304c. In this example, the bulletin board service navigator 304c highlights the japanese beetles leaf node 206c and indents the response 902. The tool bar 904 containing the subject 906, the author 908, the size 1004 and the date 1006 of a message is also shown.

The use of different navigators 304 allows a service provider to customize a particular navigator 304 for the type of service provided. Thus, when a user accesses the directory service namespace 202b or the bulletin board namespace 202a, the user sees the navigator 304 for the nodes in the selected service namespace 202. In the preferred embodiment of the present invention, the network shell 302 automatically identifies the proper navigator 304 when a user selects the node of a particular service namespace 202.

In addition, it is contemplated that future service providers may wish to provide custom navigators 304 for their assigned service namespaces 202 (their portion of the on-line network 100). For example, suppose a product support group has used a support program with a particular user interface for several years. Users of the support program are accustomed to the menus and toolbars in the support program.

When the product support group desires to provide a product support service on the on-line network 100, the on-line network 100 assigns a particular service namespace 202 to the product support group. The product support group can then use the present invention to provide users with a navigator 304 which contains the user interface that users of the product support service are accustomed to.

Figure 11:
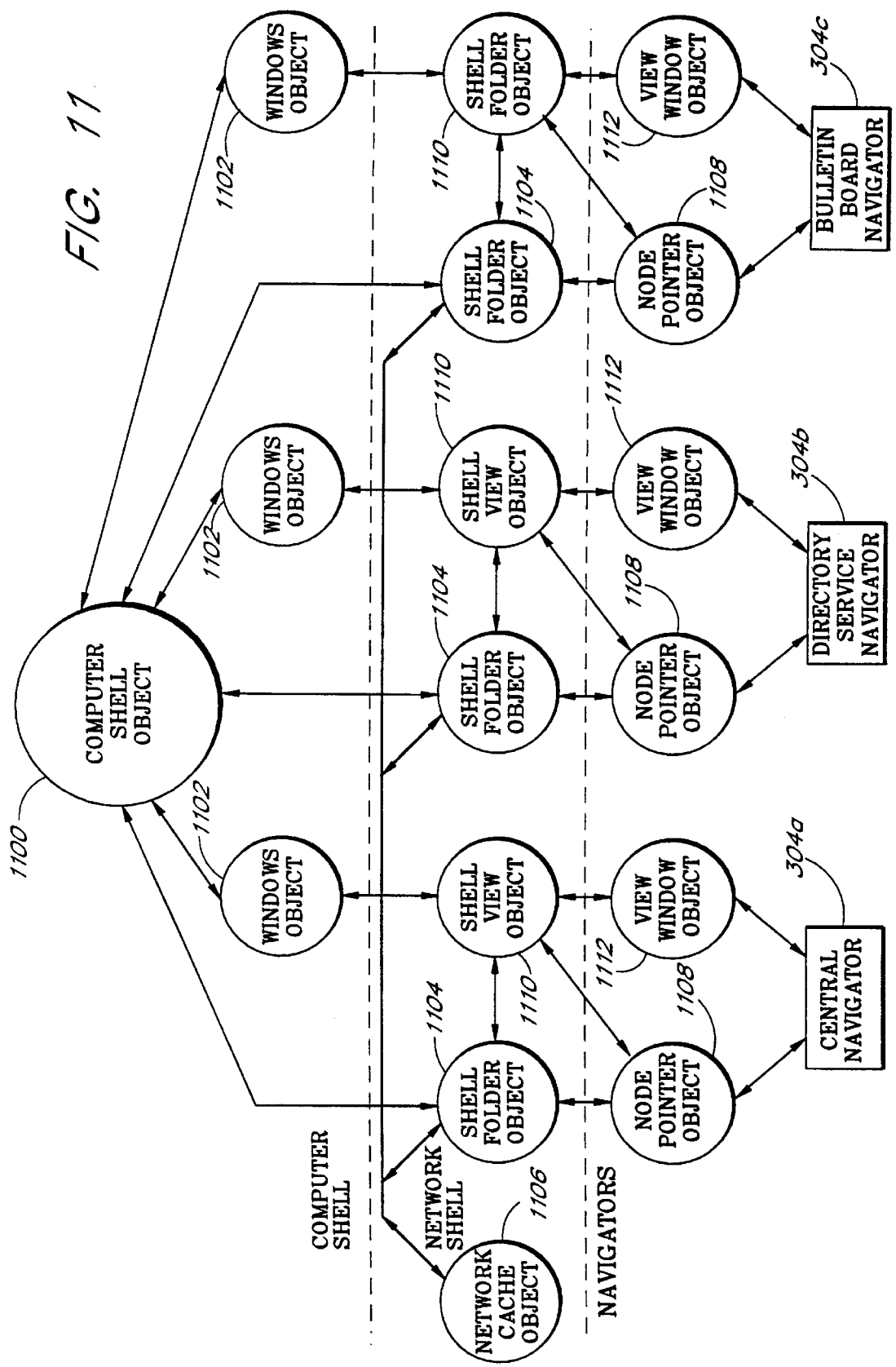
FIG. 11 is a detailed block diagram of the data structure created and used by a preferred embodiment of the present invention.

Referring now to FIG. 11, the data structure created by the on-line network access system of the preferred embodiment of the present invention is shown. The data structure exists in the memory of the local computer 102 and includes a computer shell object 1100, multiple window objects 1102, multiple shell folder objects 1104, a network cache object 1106, multiple shell view objects 1110, multiple node pointer objects 1108, multiple view window objects 1112, the central navigator 304a, the directory service navigator 304b and the bulletin board navigator 304c. While the following description describes the present invention in object-oriented terminology, a person of ordinary skill in the art will appreciate that other programming techniques can be used such as programming techniques that use defined structures, arrays, procedure calls and subroutines.

In the present invention, an object is a data structure which contains data and a set of accompanying functions which manipulate the data. A function (also called a method) is a set of programmed instructions which direct the computer hardware to perform a desired action. An object communicates with another object by "calling" a function in the object. This typically takes the form of a procedure call which specifies a particular function and passes data to the object containing the function. The functions that exist in an object are often called application programming interfaces or API'S.

In the preferred embodiment of the present invention, the computer shell 300 is represented by the computer shell object 1100 and multiple window objects 1102. The computer shell object 1100 contains the data and functions which implement the computer shell 300. In the preferred embodiment, the computer shell object 1100 and the window objects 1102 are created by the Win 95 Explorer. A window object 1102 contains the data and functions for displaying a window on a user's computer screen.

The preferred embodiment of the present invention expands the Win 95 Explorer to access the on-line network 100 via the network shell 302. As explained in more detail below, the Win 95 Explorer has been expanded to include the network identifier 214 of the root folder node 204*a*, and the software instructions that call the network shell 302 functions. One of ordinary skill in the art will also appreciate that other commercially available computer shells can be adapted to include a reference to the network identifier 214 of the root folder node 204*a*, and the network shell function calls described below.

The network shell 302 is represented by multiple shell folder objects 1104, multiple shell view objects 1110 and a network cache object 1106. In the preferred embodiment, the shell folder object 1104 is called the IShellFolder object. The IShellFolder acronym stands for an "Instance of the Shell Folder object" and is hereinafter referred to as the shell folder object 1104. Each shell folder object 1104 corresponds to a folder node 204 accessed by the user of the present invention. Each shell view object 1110 corresponds to a folder node 204 displayed by the present invention.

The network cache object 1106 is a large memory array which contains a copy of up to one thousand node pointer objects 1108 created during an on-line session. In the preferred embodiment, once the network cache object 1106 contains 1,000 node pointer objects 1108, it uses a least recently used algorithm so as not to exceed the 1,000 maximum limit. When the 1,000 limit is exceeded, the network cache object 1106 deletes ten of the least recently used node pointer objects 1108 and keeps the 990 most recently used node pointer objects 1108.

The navigators 304*a*, 304*b* and 304*c* are referenced by the node pointer objects 1108 and the view window objects 1112. Each node pointer object 1108 references a particular node on the on-line network 100. The present invention creates a node pointer object 1108 each time the user selects a new node in the on-line network 100. The present invention creates a view window object 1110 each time a node is displayed by the local computer 102. In addition, each node pointer object 1108, and each view window object 1112 references a particular navigator 304.

It should be understood that FIG. 11 only illustrates a snapshot of the data structure at a particular point in time. Thus, FIG. 11 illustrates the data structure where a user has used three different navigators 304*a*, 304*b* and 304*c* to view three nodes on the on-line network 100. As the user views additional nodes in the on-line network 100, the data structure expands to contain additional shell folder objects 1104, node pointer objects 1108, shell view objects 1110 and view window objects 1112. Further, as different navigators 304 are used, the present invention will load the additional navigators 304 into the data structure from the hard disk in the local computer 102.

Figure 12:
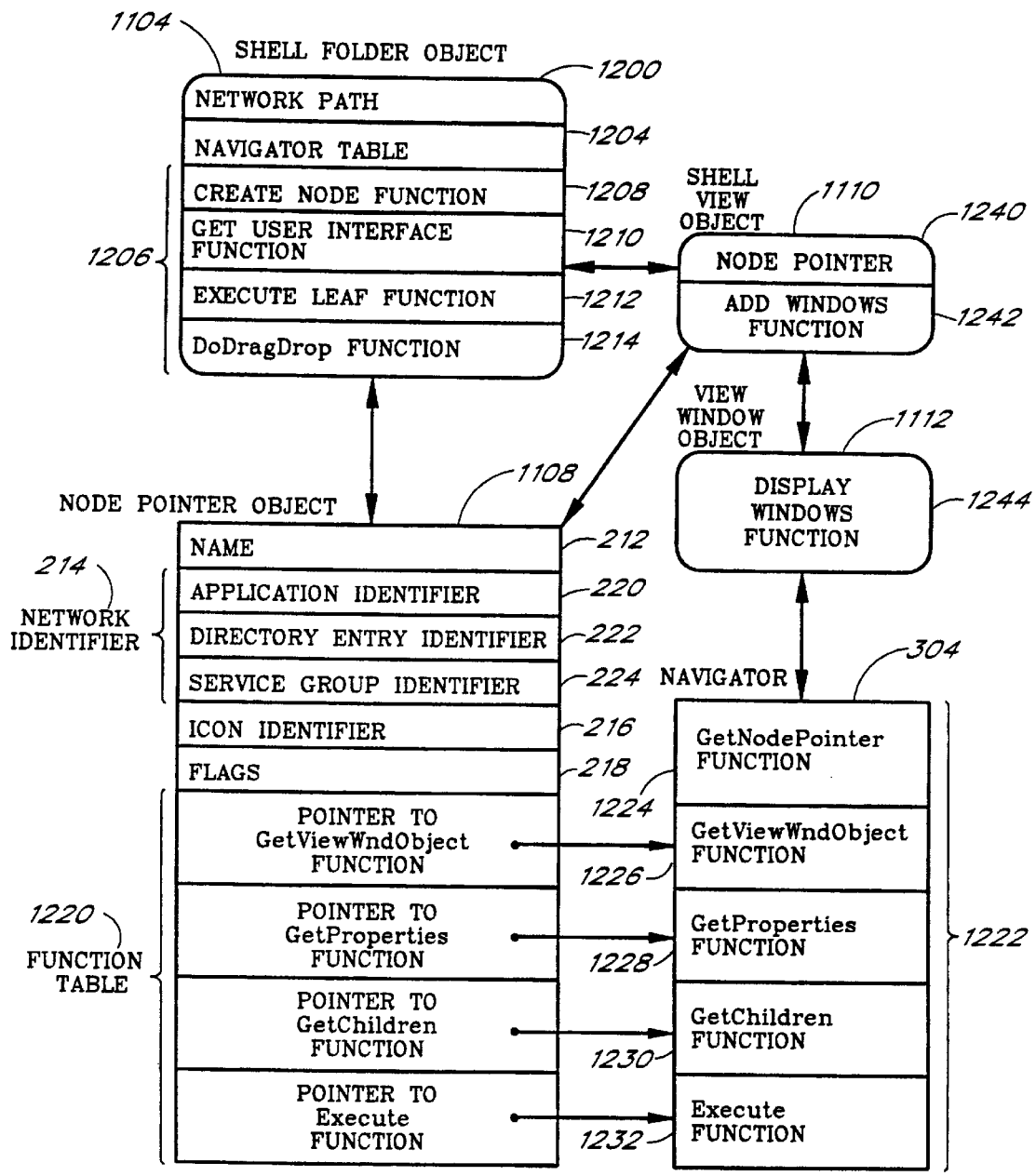
FIG. 12 is a detailed block diagram of a shell folder object, a node pointer object, a shell view object, a view window object and a navigator in the data structure of a preferred embodiment of the present invention.

Referring to FIG. 12, a detailed block diagram of a shell folder object 1104, a node pointer object 1108, a shell view object 1110, a view window object 1112 and a navigator 304 is shown. Each shell folder object 1104 contains a network identifier 214 for a particular node in the on-line network 100, a network path 1200, and a set of network shell functions 1206. The network path 1200, as described in more detail below contains the path of nodes to a particular location in the on-line network 100. The network shell functions that implement the preferred embodiment include the create node function 1208, the GetUserInterface function 1210, the execute leaf function 1212 and the DoDragDrop function 1214.

Each node pointer object 1108 references a node on the on-line network 100 and contains the set of node properties 210 such as the node's name 212, the network identifier 214, icon identifier 216, and flags 218. As discussed above, the network identifier 214 is a 128-bit number which contains the application identifier 220, the directory entry identifier 222 and the service group identifier 224. The icon identifier 216 identifies the icon image or bit-map associated with the node. The flags 218 identify whether the node is a folder node 204, a leaf node 206 or a junction point node 208.

The function table 1220 references a set of navigation functions 1222 in a particular navigator 304. The navigation functions required to implement the present invention include a GetNodePointer function 1224 (in the preferred embodiment the GetNodePointer function 1224 is actually called the GETPMTN function 1224 but is herein referred to as the GetNodePointer function 1224), a GetViewWndObject function 1226, a GetProperties function 1228, a GetChildren function 1230 and an Execute function 1232. As shown in FIG. 12, the function table 1220 in the node pointer object 1108 contains pointers which reference the navigation functions.

As will be explained in more detail below, each navigator 304 uses standardized names for particular navigation functions. This allows the shell folder objects 1104 to call a particular navigation function without knowing which navigator 304 will execute the function. For example, to get the children nodes of a folder node 204, all of the navigators 304 contain a GetChildren function 1230. Thus, the shell folder object calls the GetChildren function 1230 to direct all the navigators 304 to obtain the children nodes of a folder node 204.

Each navigator 304, however, implements its own software instructions to obtain the children nodes. If a particular navigator 304 displays the children nodes in a particular format, the GetChildren function 1230 for that navigator 304 contains the different program instructions to display the desired format. Thus, the shell folder object 1104 calls standardized function names that the navigators 304 implement differently. Thus, as new navigators 304 are added, the shell folder objects 1104 still use the standardized names that the new navigators 304 perform in a different ways to provide that navigator's 304 unique user interface.

The function table 1220 in the node pointer object 1108 links the standardized navigation functions to a particular navigator 304. As explained in more detail below, each node on the on-line network 100 is assigned to a particular navigator 304. When the present invention creates a new node pointer object 1108, the node pointer object 1108 references its assigned navigator 304. For example, in the preferred embodiment of the present invention, each node pointer object 1108 contains a function table 1220 which references the navigation functions in the central navigator 304a, the service directory navigator 304b or the bulletin board navigator 304c. In the preferred embodiment, the navigation functions 1222 are called by specifying their particular locations in the function table 1220.

Furthermore, these navigator functions 1222 are capable of accessing different data sources. In the preferred embodiment, the navigators 304 access the on-line network 100 and obtain nodal information from the on-line network 100. In other embodiments, a navigator 304 can assess a different data source such as a file on a user's hard disk, a private database or even a different on-line network 100. For example, the central navigator 304a of the present invention obtains the bit-mapped images displayed in FIGS. 5 and 6 from data stored in the user's hard disk. The central navigator 304a does not need to download these images every time the user wishes to access the on-line network.

In addition, since the navigators 304 of the present invention have the flexibility of accessing other data sources, a service provider can develop a navigator 304 that accesses other data sources for information such as information obtained by connecting to a private data base or information that exists on a user's local area network. In other embodiments, the navigators 304 can access other on-line networks such as the internet. Thus, the navigators 304 provide the flexibility of accessing information content that exists in other data sources including other on-line networks.

The central navigator 304a, the service directory navigator 304b, and the bulletin board navigator 304c are dynamic link libraries which contain their own versions of the GetNodePointer function 1224, the GetViewWndObject function 1226, the GetProperties function 1228, the GetChildren function 1230 and the Execute function 1232. Accordingly, each navigator 304, implements these functions to display the images shown in FIGS. 5–10. Thus, these navigator functions 1222 contain the software instructions which provide the different user interfaces supported by the on-line network 100.

Each shell view object 1110 contains a node pointer 1240 and an AddWindows function 1242. The node pointer 1240 references a node pointer object 1108. In addition, each shell view object 1110 references one of the view window objects 1112. As explained below, the shell view object 1110 interacts with a view window object 1112 to display the contents of a selected node.

Each view window object contains a DisplayWindow function 1244 that is used to assess a particular navigator 304. As is explained in more detail below, the AddWindows function 1242 in the shell view object 1110 calls the DisplayWindow function 1244 in the view window object 1112 to display the right pane 404 in the window 400. The DisplayWindow function 1244 then executes the instructions that direct the referenced navigator 304 to display the images in the right pane 404 existing in the window 400.

Referring now to FIG. 13, the data format which represents an on-line network node in the preferred embodiment of the present invention is shown. Because computer shells 300 often require specific data formats, the present invention formats the data contained in an on-line network node to comply with the data format of the computer shell 300. Thus, in order to display information about an on-line network node in the computer shell 300, the network shell 302 encapsulates the network identifier 214 associated with the on-line network node into a computer shell 300 compatible data structure.

In the preferred embodiment, the network shell 302 formats the network identifier 214 to comply with the data format of the Win 95 Explorer. In particular, the network shell 302 adds a length header 1300 to the network identifier 214. The length header 1300 is 16 bits (two bytes) long and contains the size of the 128-bit network identifier 214. Since many software compilers require eight byte data boundaries, the length header 1300 of the preferred embodiment is eight bytes with six unused bytes. In addition, the preferred embodiment adds a validator 1302 which represents the decimal number 112,393. The validator 1302 is used for debugging purposes and indicates that the data structure relates to a node on the on-line network 100.

Referring to FIG. 14, the present invention represents an example of the format of the network path 1200 located in each shell folder object 1104. The network path 1200 in this example, is the path to the categories folder node 204g. The network path 1200 includes the length header 1300, the network identifier 214 and the validator 1302 for the on-line network root folder node 204a and the length header 1300, the network identifier 214 and the validator 1302 for the categories folder node 204g. The end of the network path 1200 is signaled by a null data segment 1304 which is set to zero.

Figure 15:
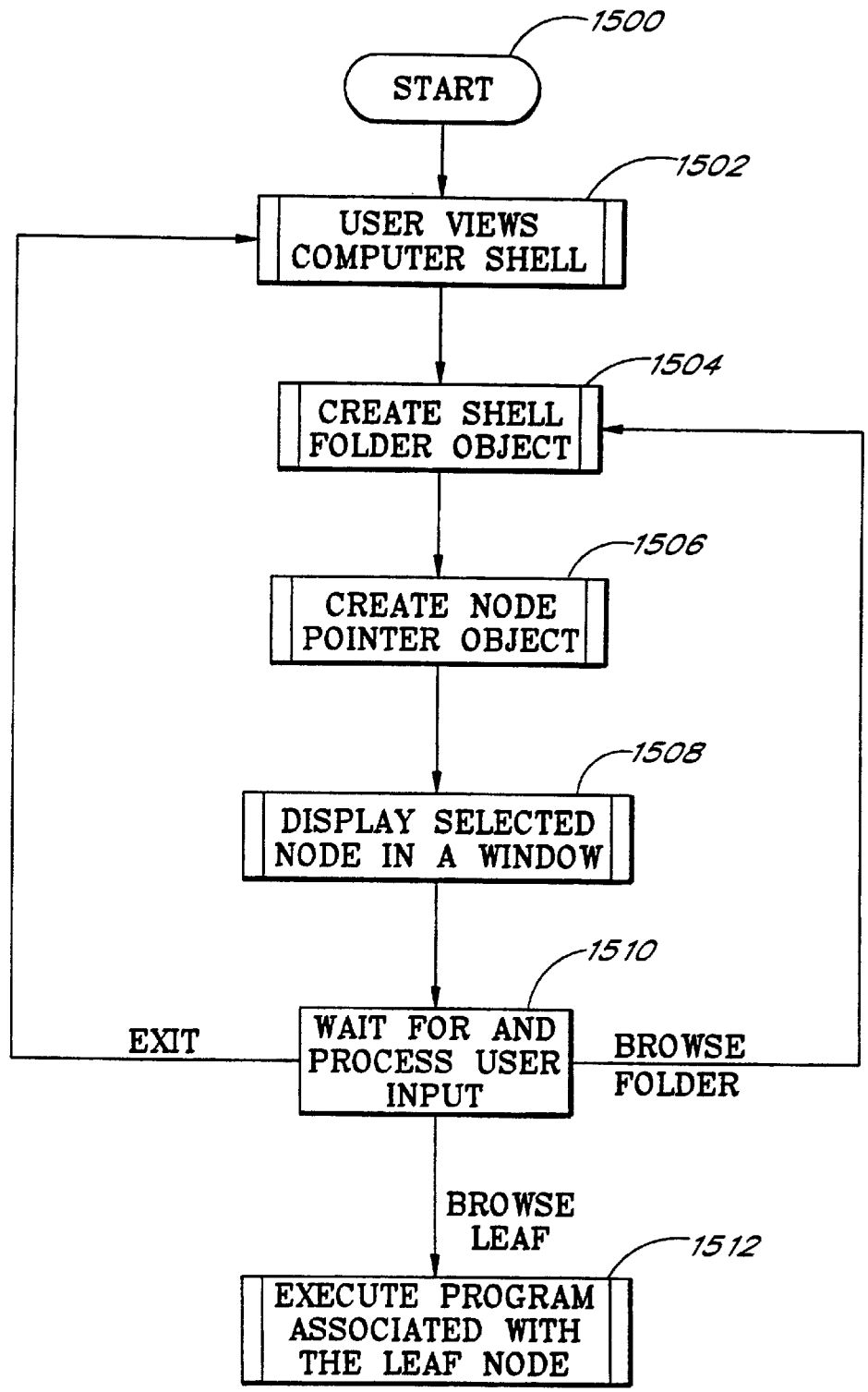
FIG. 15 is a high-level flow chart illustrating the overall functional operation of a preferred embodiment of the present invention.

Referring now to FIG. 15, a high level flow chart which outlines the execution states of the present invention is shown. Upon activation of a user's computer, in start state 1500, the computer loads the operating system and proceeds to state 1502. In state 1502, the local computer 102 displays the operating system user interface or computer shell 300. In the preferred embodiment, the user views the Win 95 Explorer. While in state 1502, a user can browse his local hard disk and view the programs, files and documents stored on his local hard disk.

In response to a user's selection of the on-line network 100, the computer shell 300 proceeds to state 1504. For example, the computer shell 300 proceeds to state 1504 when the user selects an on-line network icon or chooses an on-line network menu command in the computer shell 300. In state 1504, the computer shell passes the network identifier 214 for the root folder node 204a to the Object Linking and Embedding module in the operating system of the local computer 102. Using the network identifier 214, the Object Linking and Embedding module invokes the network shell 302 and creates the shell folder object 1104 and the network cache object 1106.

Proceeding to state 1506 the shell folder object 1104 determines which navigator 304 corresponds to the root folder node 204a. As discussed in more detail below, the shell folder object 1104 determines that the central navigator 304a is assigned to the root folder node 204a. After identifying the central navigator 304a, the shell folder object 11034 invokes the central navigator 304a and directs the central navigator 304a to obtain information about the root folder node 204a. While in state 1506, the central navigator 304a then creates a node pointer object 1108 which references the root folder node 204a. In addition, the central navigator 304a creates the function table 1220 in the node pointer object 1108 which references the navigation routines in the central navigator 304a.

Proceeding to state 1508, the present invention displays the selected node on the display of the local computer 102. While in state 1508, the computer shell object 1100 directs the shell folder object 1104 to create the shell view object 1110 and the view window object 1112. The shell view object 1110 and the view window object 1112 then direct the 304 to retrieve the set of node properties 210 associated with the root folder node 204a and to display the properties in the right pane 404 of the window object 1102.

For example, as shown in FIG. 5, when displaying the set of node properties 210 associated with the root folder node 204a, the computer shell object 1100 displays the content map in the left pane 402 and the central navigator 304a displays the contents of the root folder node 204a in the right pane 404. In this example, the shell view object 1110 and the view window object 1112 direct the central navigator 304a displays the contents of the root folder node 204a as a number of icon buttons 502.

Proceeding to state 1510, the navigator 304 waits for the user to input a request. For example, when viewing the root folder node 204a, the user may choose to select one of the icon buttons 502 or exit the on-line network 100. If the user chooses to exit the on-line network 100, the navigator proceeds back to state 1502. While in state 1510, the navigator 304 communicates with the network shell 302 when the user desires to return to the computer shell object 1100 and stop communicating with the on-line network 100. In the preferred embodiment, the computer shell object 1100 ends communications with the on-line network 100 and deletes any window objects 1102 associated with the on-line network 100, the network cache object 1106, the shell folder objects 1104, the node pointer objects 1108, the shell view object 1110, the view window object 1112 and the navigators 304 which exist in the data structure.

If, instead of exiting the on-line network 100, the user selects another node while in state 1510, the present invention determines whether the selected node is a folder node 204, a leaf node 206, or junction point node 208. For example, if the user selects the categories icon button 502 displayed by the central navigator 304a, the central navigator 304a determines whether the categories node is a folder node 204 or a leaf node 206. In this example, the central navigator 304a determines the node type by retrieving the set of node properties 210 associated with the selected node. In the set of properties 201 exist the flags 218 which contain a folder node flag, a leaf node flag and a junction node flag. If the folder flag 218 is set, the node is a folder node 204. If the leaf flag 218 is set, the node is a leaf node 206. If the junction node flag 218 is set, the node is a junction node.

As explained above, a folder node 204 references other nodes. Thus, if the user selects a folder node 204, the navigator notifies the shell folder object 1104 that the user has selected a folder node and proceeds back to state 1504. As explained above, in state 1504, a shell folder object 1104 is created for the selected folder node 204.

If the user selects a leaf node 206, the navigator 304 notifies the shell folder object 1104 that the user has selected a leaf node 206 and proceeds to state 1512. A leaf node 206 does not reference other nodes and contains such things as executable programs and data files. In state 1512, The shell folder object 1104 locates an executable program associated with the leaf node 206 and launches the executable program. For example, when the user selects a chat room, the shell folder object 1104 locates and invokes a client chat application.

Figure 16:
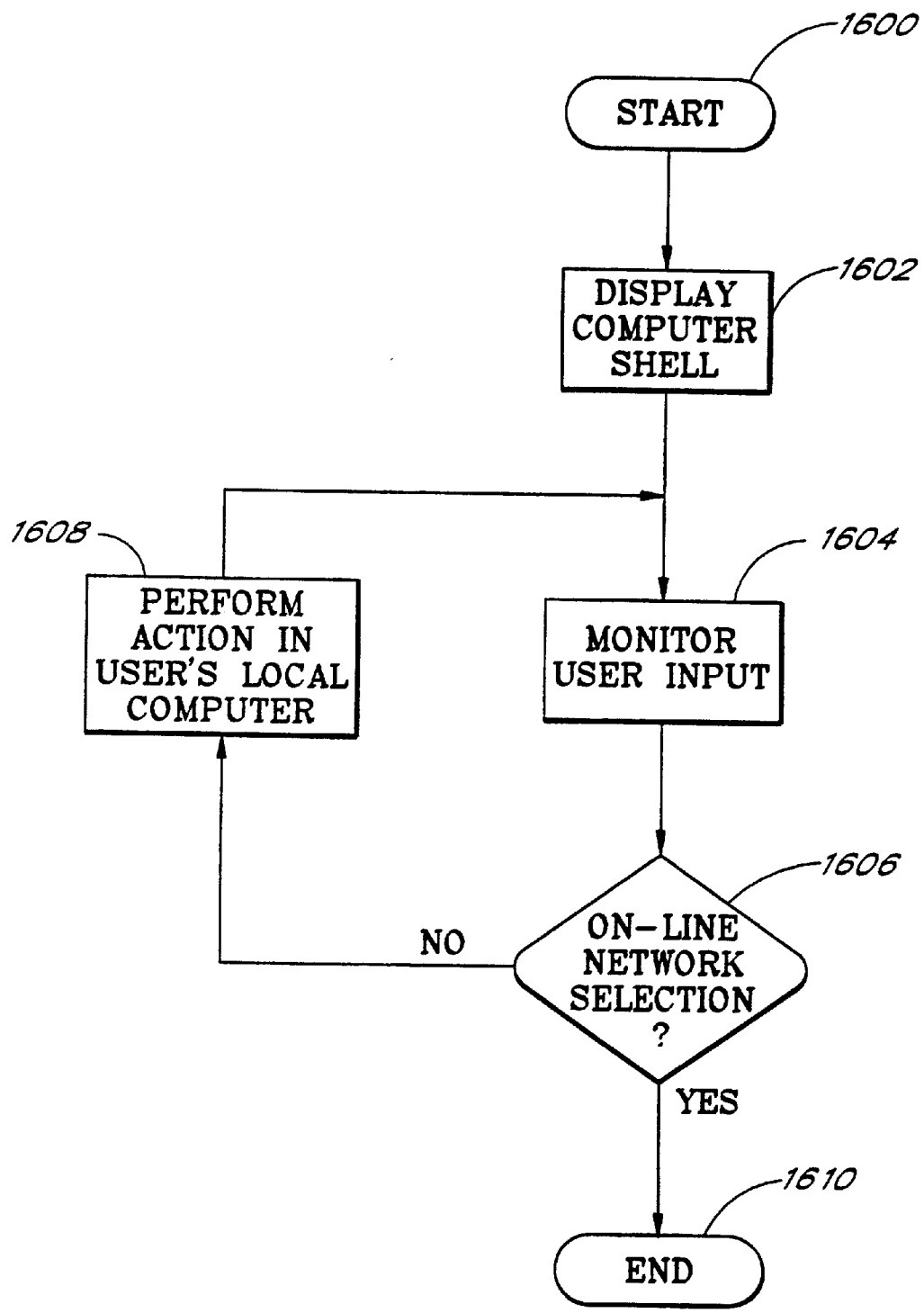
FIG. 16 is a flow chart illustrating the functional operation of the computer shell module in a preferred embodiment of the present invention.

Each of the states in the high-level flow chart of FIG. 15 will now be discussed in detail. Referring now to FIG. 16, a detailed flow chart of the operation of the computer shell object 1100 in state 1502 is shown. As explained above, Win 95 Explorer begins in start state 1600 and proceeds to state 1602.

While in state 1602, the computer shell object 1100 uses techniques known in the art to display a windows oriented computer user interface. In particular, the computer shell object 1100 uses techniques known to one of ordinary skill in the art to create objects and display the computer's file system as a hierarchical structure of folders, data files and programs.

Proceeding to state 1604, the computer shell object 1100 monitors the user's input commands. Monitoring the user's input commands is accomplished via a variety of techniques known to one of ordinary skill in the art such as monitoring the keyboard, a mouse input device, a voice input device, etc. Once a user inputs a command, the computer shell object 1100 proceeds to state 1606, where the computer shell object 1100 checks to see if the user has selected the on-line network 100. If not, the computer shell object 1100 proceeds to state 1608 where the computer shell object 1100 performs the user's input command in the user's local computer.

Figure 17:
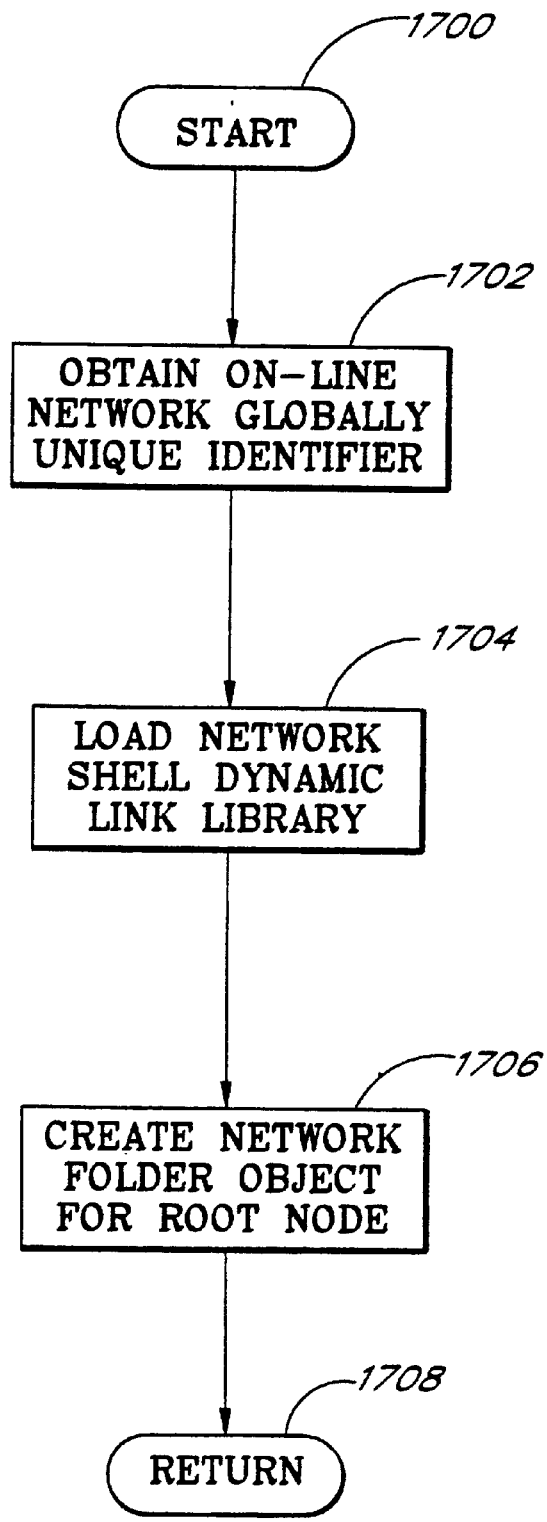
FIG. 17 is a flow chart illustrating the invocation of the network shell module in one presently preferred embodiment of the present invention.

If the user, however, selects the on-line network 100, the computer shell object 1100 proceeds back to state 1504 via return state 1610. Referring to the flow charts illustrated in FIGS. 15 and 17, the computer shell object 1100 creates the shell folder object 1104 and the network cache object 1106 in state 1504. Beginning in a start state 1700, the computer shell object 1100 proceeds to state 1702. In state 1702, the computer shell object 1100 obtains the on-line network globally unique identifier. In the preferred embodiment of the present invention, the on-line network is identified with a globally unique identifier which has been predefined by the creator of the on-line network.

This globally unique identifier (also called a GUID) is a 128 bit value which is stored in the program of the computer shell object 1100. In the preferred embodiment, the on-line network globally unique identifier is the network identifier 214 for the root folder node 204a in the on-line network 100. When a user selects the icon which represents the on-line network 100, or inputs a command requesting the on-line network 100, the computer shell object 1100 uses the network identifier 214 of the root folder node 204a to create the shell folder object 1104.

Proceeding to state 1704, the computer shell object 1100 loads the network shell dynamic link library into the memory of the local computer 102 and calls the CoCreateInstance function in the Object Linking and Embedding module. The CoCreateInstance function loads the network shell dynamic link library into the computer's memory. The CoCreateInstance function is well known in the art, and is described in *OLE 2 Programmer's Reference Vol. I*, Microsoft Press, 1993, pp. 256 and in *OLE 2 Programmer's Reference Vol. II*, Microsoft Press, 1993, pp. 56–62, and Brockschmidt, *Inside OLE 2*, Microsoft Press, 1994, pp. 149–152.

While in state 1704, the OLE CoCreateInstance function uses the network identifier 214 of the root folder node 204a as an index into an OLE table which associates the network identifier 214 with the network shell dynamic link library. The OLE table is predefined and is loaded into the user's computer when the user installs the operating system.

The OLE table contains the location of the network shell dynamic link library in the user's computer hard disk. The CoCreateInstance function uses the location of the network shell dynamic link library from the OLE table to load the network shell dynamic link library into the computer's memory.

When loading the network shell dynamic link library, the setup routines in the network shell dynamic link library create the network cache object 1106. The network cache object 1106 is a block of memory which holds the node pointer objects 1108 which, as discussed in more detail below, are created to reference the network nodes. The network cache object 1106 holds up to 1,000 node pointer objects 1108 created during a particular logon session. When more than 1,000 node pointer objects 1108 are accessed during a particular logon session, the network cache object 1106 deletes ten of the least recently made copies of the node pointer objects 1108 from its cache memory.

The network cache object 1106 of the present invention only lasts while the user is connected to the on-line network 100. As explained below, if the user exits the on-line network 100, the network cache object 1106 and its contents are deleted. Thus, a new network cache object 1106 is created each time the user accesses the on-line network 100.

Proceeding to state 1706, the CoCreateInstance routine creates the shell folder object 1104. While in state 1706, the CoCreateInstance routine stores the network path 1200 in the newly created shell folder object 1104. After creating the shell folder object 1104, the CoCreateInstance function then proceeds to return state 1708.

Referring to FIG. 15, the shell folder object 1104 creates a node pointer object 1108 in state 1506. In the preferred embodiment, the computer shell object 1100 calls the create node function 1208 in the shell folder object 1104. The create node function 1208 requires communications among the computer shell object 1100, the shell folder object 1104, the node pointer object 1108 and a particular navigator 304.

In the preferred embodiment, the create node function 1208 is called the HrGetPMtn function which is a global routine in the network shell dynamic link library. The HrGetPMtn acronym means "get a pointer to the Microsoft Tree Node Object" and is hereinafter referred to as the create node function 1208. The computer shell object 1100 contains a program instruction which "calls" the create node function 1208. The program instruction in the computer shell object 1100 which "calls" the create node function 1208 that exists in the network shell 302. When calling the create node function 1208, the computer shell object 1100 passes the network identifier 214 of the on-line network node.

For example, for the root folder node 204a, the computer shell object 1100 calls the create node function 1208 in the network shell 302 and passes the network identifier 214 for the root folder node 204a. As explained above, the network identifier 214 for the root folder node 204a is stored in the programmed instructions of the computer shell object 1100.

Figure 18:
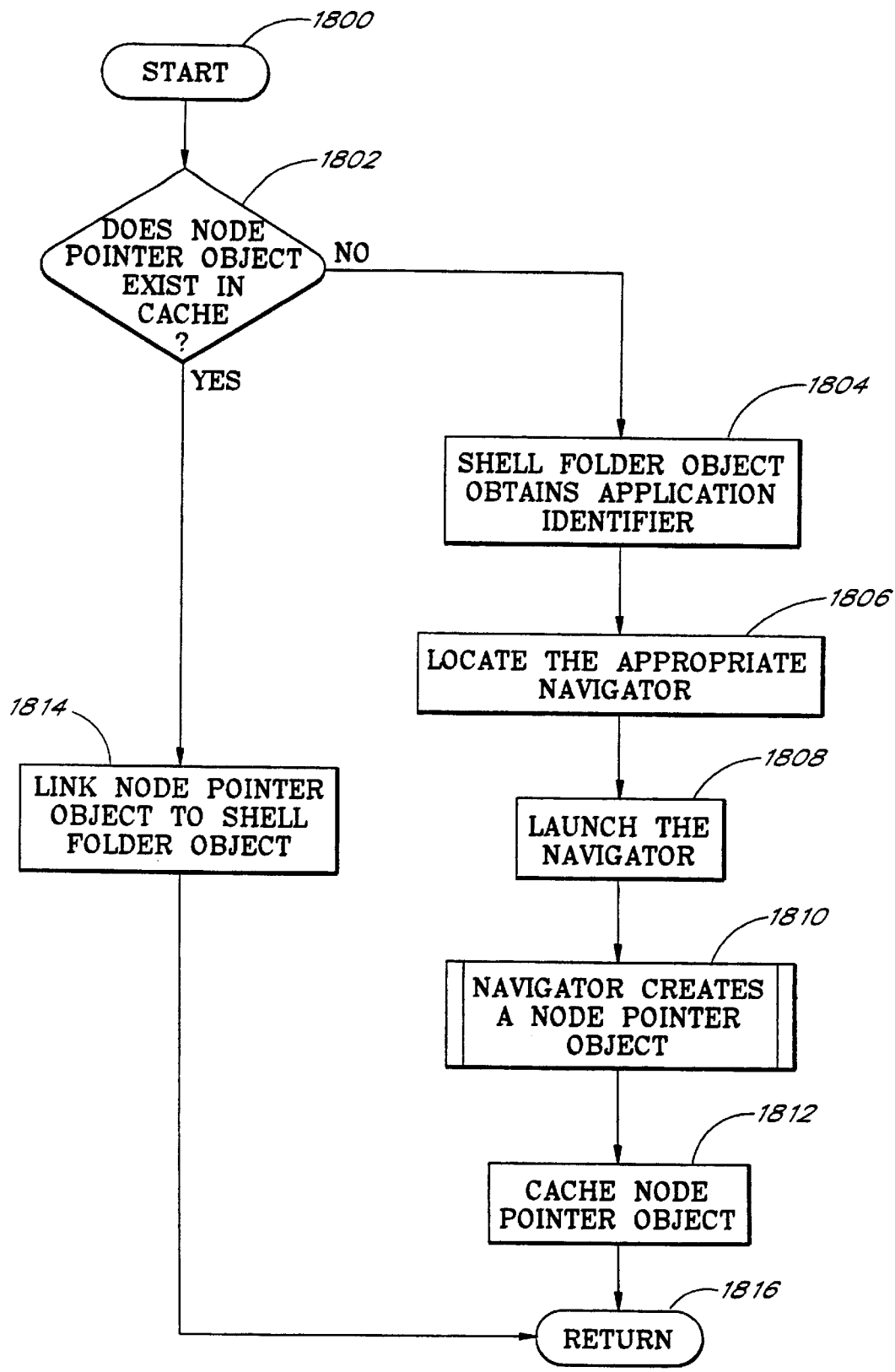
FIG. 18 is a flow chart illustrating one embodiment of the create node function invoked to create a node object in one presently preferred embodiment of the present invention.

A detailed flow chart of the create node function 1208 is shown in FIG. 18. The create node function begins in a start state 1800 and proceeds to state 1802. In state 1802, the create node function 1208 uses the network identifier 214 to determine whether the node pointer object 1108 for a particular node already exists in the network cache object 1106. As explained in more detail below, if a node pointer object 1108 exists in the network cache object 1106 the create node function 1208 proceeds to state 1814. In state 1814, the create node function 1208 links the node pointer object to the shell folder object 1104 and proceeds to return state 1816.

If the network cache object does not contain the node pointer object 1108, the create node function 1208 proceeds to state 1804. In this example, the network cache object 1106 is empty since the computer shell object 1100 just created the network cache object 1106. While in state 1804, the create node function 1208 extracts the application identifier 220 from the network identifier 214. In the preferred embodiment, the application identifier 220 is the first 32 bits of the network identifier 214 and is defined to be the number three.

Proceeding to state 1806, the create node function 1208 locates the navigator 304 which corresponds to the application identifier. Specifically, the create node function 1208 uses the application identifier 220 as an index into a navigator table 1204. The navigator table 1204 exists in the shell folder object 1104 and is updated every time a new navigator 304 is installed on the user's computer. The navigator table 1204 is a lookup table which contains the location of the navigator 304 which corresponds to the application identifier 220.

For example, the create node function 1208 uses the application identifier 220 (which is three as shown in Table 1) of the root folder node 240a, to locate the third entry in the lookup table. The third entry in the lookup table then contains the file path to the location of the central navigator 304a on the user's computer hard disk. When the user installs a navigator, the navigator table 1204 references the location of the central navigator 304a on the user's hard disk.

Proceeding to state 1808, the create node function 1208 loads the navigator 304 referenced in the navigator table 1204. Preferably, the navigator 304 is a dynamic link library which provides the set of common navigation functions 1222. As explained above, in the preferred embodiment, each navigator 304 contains the navigation function names, but implments the function names with different software instructions. Once loaded into memory, this set of navigation functions 1222 implement the navigator's 304 unique interface. For the root folder node 204a, the create node function 1208 retrieves the central navigator 304a from the hard disk and loads it into memory.

Proceeding to state 1810, the create node function 1208 directs the navigator 304 to create the node pointer object 1108 by calling the GetNodePointer function 1224 in the navigator 304. Specifically, in this example, the create node function 1208 in the shell folder object 1104 contains a program instruction which calls the GetNodePointer function 1224 existing in the central navigator 304a. When the create node function 1208 calls the GetNodePointer function 1224, it passes the directory entry identifier 222 of the root folder node. As explained above, the directory entry identifier 222 is a 64-bit value which uniquely identifies each node in a particular service namespace 202.

Figure 19:
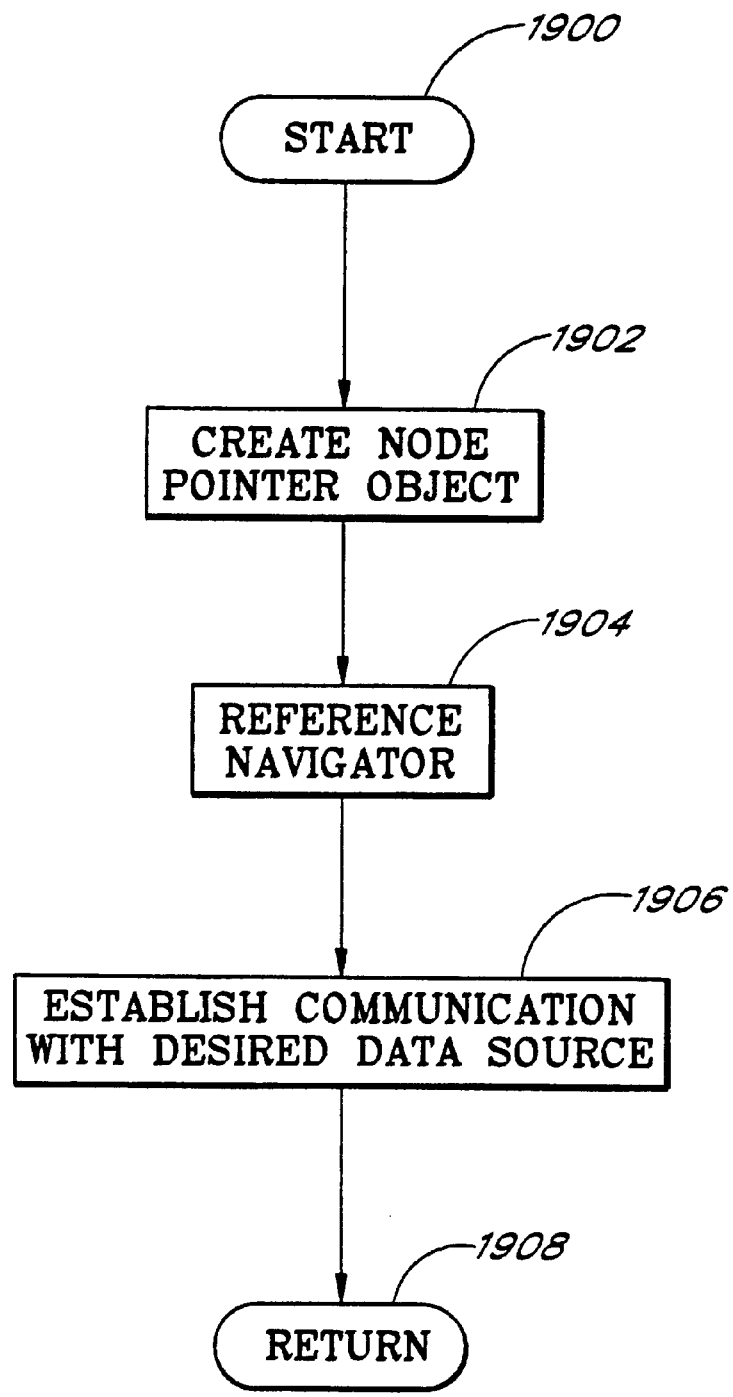
FIG. 19 is a flow chart illustrating one embodiment of the GetNodePointer function invoked to link a node pointer object to a particular navigator module in a preferred embodiment of the present invention.

Referring to FIG. 19, a detailed flow chart of the GetNodePointer function 1224 of state 1810 is shown. Beginning in a start state 1900, the GetNodePointer function 1224 proceeds to state 1902. In state 1902, the GetNode Pointer function 1224 uses object creation techniques known to one skilled in the art to create the node pointer object 1108. While in state 1904, the GetNodePointer function 1224 stores the directory entry identifier 222 in the newly created node pointer object 1108. In this example, the GetNodePointer function 1224 stores the directory entry identifier 222 for the root folder node 204a in the node pointer object 1108.

After creating the node pointer object, the GetNodePointer function 1224 proceeds to state 1904. In state 1904, the GetNodePointer function 1224 links the pointers in the function table 1220 to a particular navigator 304. For example, for the node pointer object 1108 which references the root folder node 204a, the central navigator 304a sets the pointers in the function table 1220 to reference the set of navigation functions 1222 in the central navigator 304a. This set of navigation functions 1222 is later used to obtain the properties of the root folder node 204a, the children of the nodes, etc.

Proceeding to state 1906, the GetNodePointer function 1224 establishes a connection with a data source such as the on-line network 100 and locates the node on the on-line network with the same directory entry identifier. As explained above, the navigators 304 can reference different data sources. Thus instead of accessing the on-line network, a navigator 304 could use commonly known techniques to reference another data source such as local data base, or access some other on-line network such as the internet.

In this example, the central navigator 304 accesses the on-line network 100 to locate the root folder node 204a. The GetNodePointer function 1224 first compares its directory entry identifier 222 with the directory entry identifier 222 in the root folder node 204a of the on-line network 100. Since, in this example, the two are identical, the GetNodePointer function 1224 immediately locates the root folder node 204a.

The GetNodePointer function 1224 then proceeds to return state 1908. In return state 1908, the GetNodePointer function 1224 in the navigator 304 returns control back to the create node function 1208 in the shell folder object 1104.

Referring now to FIG. 18, the create node function 1208 in the shell folder object 1104 then proceeds to state 1812. In state 1812, the create node function 1208 stores a copy of the newly created node pointer object 1108 in the network cache object 1106. The create node function 1208 then proceeds to a return state 1816.

Referring now to FIG. 15, the shell folder object 1104 then proceeds to state 1508. In state 1508, the present invention displays the contents of a node on the user's computer monitor. While in state 1508, the computer shell object 1100 creates the window object 1102 and displays the left pane 402 of window 400. As described in more detail below, the computer shell object 1100 then directs the shell folder object 1104 to execute the functions that creates the right pane 404 of window 400.

In particular, the computer shell object 1100 executes the GetUserInterface function 1210 which creates the shell view object 1110. The shell view object 1110 then calls the GetViewWndObject function 1226 which creates the view window object 1112. As described below, the shell view object 1110, the view window object 1112, and the navigator 304 then interact to display the contents of the on-line node referenced by the node pointer object 1108.

Figure 20:
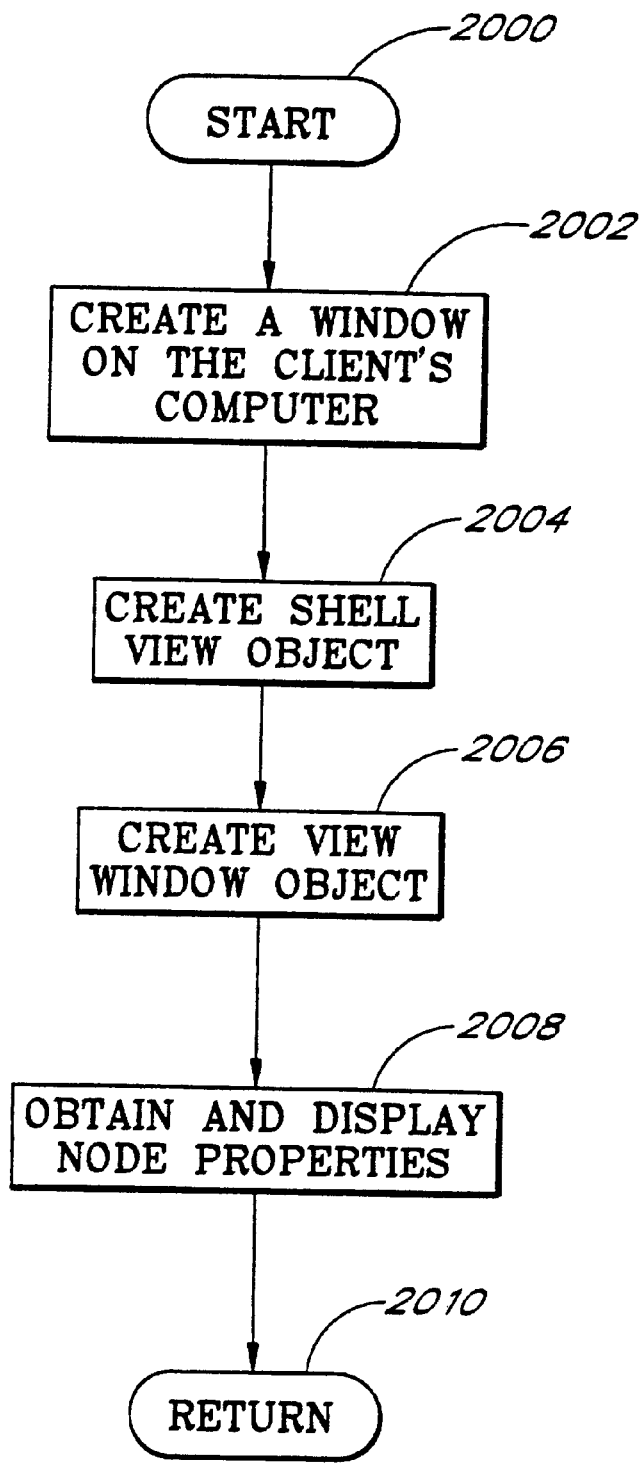
FIG. 20 is a flow chart illustrating the display of a on-line network node on a user's computer in a preferred embodiment of the present invention.

Referring now to FIG. 20, a detailed flow chart of the state 1508 is shown. Beginning in a start state 2000, the computer shell object 1100 proceeds to state 2002. In state 2002, the computer shell object 1100 uses techniques known to one of ordinary skill in the art to create an object such as the window object 1102 which displays a window on the user's local computer 102. After creating the window, the computer shell object 1100 also displays the content map in the left pane 402 of window 400. The computer shell object 1100 uses the network path 1200 to display the data paths to nodes in the on-line network 100.

Proceeding to state 2004, the computer shell object 1100 directs the shell folder object 1104 to create the shell view object 1110. In the preferred embodiment, the computer shell object 1100 calls the GetUserInterface function 1210 that exists in the shell folder object 1104. When the computer shell object 1100 calls the GetUserInterface function 1210, the computer shell object 1100 passes the node pointer 1240. The node pointer 1240 that references the node pointer object 1108. Using object creation skills known to one of ordinary skill in the art, the GetUserInterface function 1210 creates the shell view object 1110 and stores the node pointer 1240 in the newly created shell view object 1110.

Proceeding to state 2006, the GetUserInterface function 1210 directs the shell view object 1110 to create the view window object 1112. In the preferred embodiment, the GetUserInterface function 1210 directs the shell view object to call the GetViewWndObject function 1226 in the node pointer object 1108. When calling the GetViewWndObject function 1226, the shell view object 1110 uses the node pointer 1240 to identify the referenced node pointer object 1108. The GetViewWndObject acronym stands for "get the view window object."

As explained above, the node pointer object 1108 contains a function table 1220 which points to the set of standardized navigation functions 1222 in the referenced navigator 304. The referenced navigator 304 then executes its implementation of the GetViewWndObject function 1226 which creates the view window object 1112. This allows the shell view object 1110 to the call a standardized navigation function that each navigator 304 implements in a different manner to create its own unique user interface.

In this example, the shell view object 1110 calls the GetViewWndObject function 1226 that the node pointer object references in the central navigator 304a. The central navigator 304a then executes its implementation of the GetViewWndObject function 1226. The GetViewWndObject function 1226 in the central navigator 304a creates the view window object 1112.

After creating the view window object in state 2006, the GetViewWndObject function 1226 in the navigator 304 returns control back to the shell view object 1110 (the shell view object originally called the GetViewwndObject function 1226). The shell view object 1110 then returns control back to the shell folder object 1104. The shell folder object completes execution of the GetUserInterface function 1210 and returns control back to the computer shell object 1100.

Proceeding to state 2008, the computer shell object 1100 directs the shell view object 1110 to display the right pane 404 of the window 400. In state 2008, the computer shell object 1100 calls the AddWindows function 1242 in the shell view object 1110. The AddWindows function 1242 in turn calls the display windows function 1244 in the view window object 1112. The display windows function 1244 then obtains and displays the contents of the selected node in the right pane 404 of the window 400.

For the selected root folder node 204a, the display windows function in the view window object 1112 obtains the root folder node's 204a set of node properties 210 and displays the button icons 502 illustrated in FIG. 5. Proceeding to return state 2010, the display windows function 1244 returns control back to the shell view object 1110 (the shell view object 1110 originally called the display windows function 1244). The shell view object 1110 then completes execution of the AddWindows function 1242 and returns control back to the computer shell object 1100 (the computer shell object 1100 originally called the AddWindows function 1242).

Because the present invention uses standardized function calls which reference different navigators 304, developers implement new navigators 304 which display their own user interfaces. To do so, the developer of a new navigator 304 uses the standardized GetViewWndObject function 1226 name, but programs different instructions to display the new user interface.

a. Selection Of A Folder Node

Figure 21:
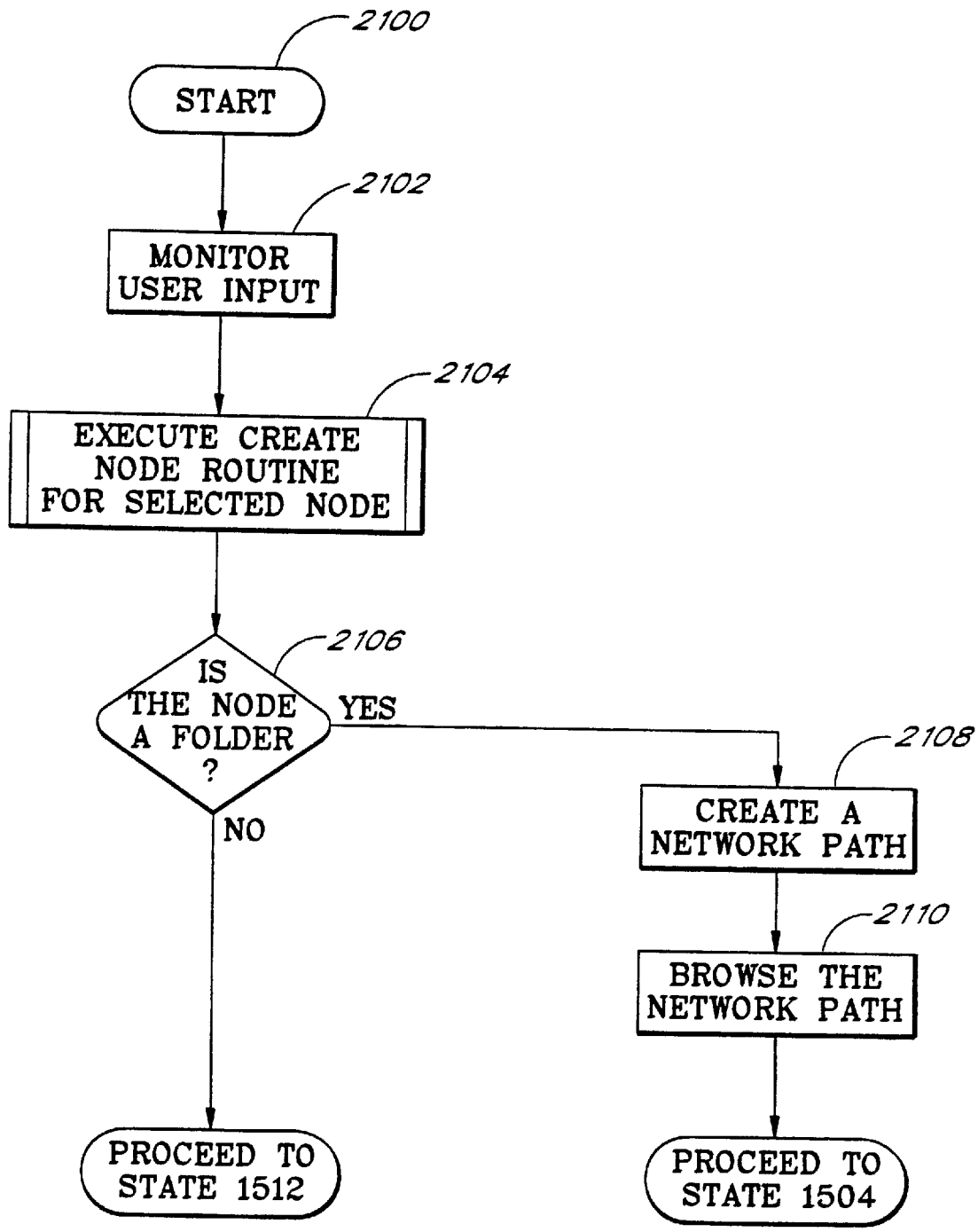
FIG. 21 is a flow chart illustrating one embodiment of the function invoked to identify a folder node or a leaf node in the present invention.

Referring now to FIG. 15, the present invention proceeds to state 1510 and waits for the user's input. A detailed flow chart of state 1510 is shown in FIG. 21. Beginning in a state 2100, the present invention proceeds to state 2102. In state 2102 the user views the window object 1102 which displays information about the selected node. In this example, the user views the window object 1102 which displays the root folder node 204a. When the user selects one of the button icons 502 in state 1510, the present invention proceeds to state 2104.

In state 2104, the navigator 304 communicates to the shell folder object 1104 which the user has selected a particular icon or menu command. In this example, each icon represents another node in the on-line network 100 and has a network identifier 214 associated with it. Once the user selects another node in the on-line network 100, the shell folder object 1104 must create a new node pointer object 1108 for the selected node. The shell folder object 1104 creates the new node pointer object 1108 using the functions described above.

While in state 2104, the shell folder object 1104 creates a new node pointer object 1108. The shell folder object 1104 uses the new node pointer object 1108 to obtain the flags 218 associated with the selected node. With the flags 218, the shell folder object determines whether the selected node is a folder node 204 or a leaf node 206. In this example, the user selects the categories folder node 204g. In state 2104, the central navigator 304 directs the shell folder object 1104 to create a new categories node 204g pointer object 1108 by calling the create node function 1208. Thus, the central navigator uses the same create node function 1208 as discussed above.

Executing the same steps illustrated in FIGS. 18 and 19, the create node function 1208 uses the application identifier 220 of the categories node 204g to create a new node pointer object 1108. In this example, the categories node 204g in the on-line network 100 is part of the directory service namespace 202b. In the preferred embodiment, the application identifier 220 for the directory service navigator is the number one.

With the application identifier 220, the create node function 1208 locates the directory service navigator 304b and loads the directory service navigator 304b into the computer's memory. The directory service navigator 304 then creates the categories node pointer object 1108 and sets the pointers in the function table 1220. The pointers in the function table 1220 reference the set of navigation functions 1222 in the directory service navigator 304b. In addition, a copy of the categories node pointer object 1108 is stored in the network cache object 1106. Once complete, the create node function returns control back to the central navigator in state 2106.

Proceeding to state 2106, central navigator directs the shell folder object 1104 to determine whether the categories folder node 204g is a folder node 204 or a leaf node 206 by analyzing the flags 218. In this example, the folder flags 218 indicates that the categories folder node 204g is a folder node 204.

Since the categories folder node 204g is a folder node 204, the present invention creates a network path 1200 which contains the "path" or list of nodes to the categories folder node 204g in state 2108. The network path 1200 to the categories folder node 204g is shown in FIG. 14. To create the network path 1200, the shell folder object 1104 adds the length header 1300, the network identifier 214 and the validator 1302 of the categories folder node 204g to the network path 1200 stored in the shell folder object 1104. In addition, the shell folder object 1104 adds the null data segment 1304 to signal the end of the network path 1200. In this example, the network path 1200 stored in the shell folder object 1104 contains the length header 1300, network identifier 214 and validator 1302 associated with the root folder node 204a.

Proceeding to state 2110, the shell folder object 1104 calls a browser function which exists in the computer shell object 1100. When the shell folder object 1104 calls the browser function, it passes the network path 1200 created in state 2108. The browser function in the computer shell object 1100 traverses the network path 1200 until it comes to the last node in the network path 1200 (in this example, the categories folder node 204g). The browser function in the computer shell 300 then extracts the network identifier 214 for the last node in the network path 1200 and proceeds to state 1504 where the present invention creates a new shell folder object for the selected categories folder node 204g.

After creating the new shell folder object 1104 with the CoCreateInstance function in state 1504 as described above, the computer shell 300 proceeds to state 1506 where it again calls the create node function 1208. In this example, the create node function 1208 retrieves the categories node pointer object 1108 from the network cache object 1106 and links the categories node pointer object 1108 to the new shell folder object 1104. The categories node pointer object 1108 exists in the network cache object 1106, since the categories node pointer object 1108 was previously created to determine whether the categories node was a folder node 204 or a leaf node 206.

Proceeding to state 1508, the computer shell object 1100 directs the present invention to display the contents of the categories folder node 204g of the monitor of the local computer 102. As explained above, the computer shell object 1100 creates the window object 1102 and displays the left pane 402 of window 400. The computer shell object 1100 then directs the shell folder object 1104 to create the shell view object 1110 and the view window object 1112 that display the right pane 404 in the window object 1102.

b. Selection Of A Leaf Node

If, in state 1510, the user selects a leaf node 206, the present invention, as described below invokes a client application associated with the leaf node 206. Referring to FIG. 21, the flow chart for state 1510 shows that the present invention monitors the user's input in state 2102, if a user selects a leaf node 206 in state 2102, the present invention creates a new node pointer object 1108 in state 2104 and obtains the leaf flag 218. In state 2106, the leaf flag 218 is set and the present invention proceeds to state 1512.

Figure 22:
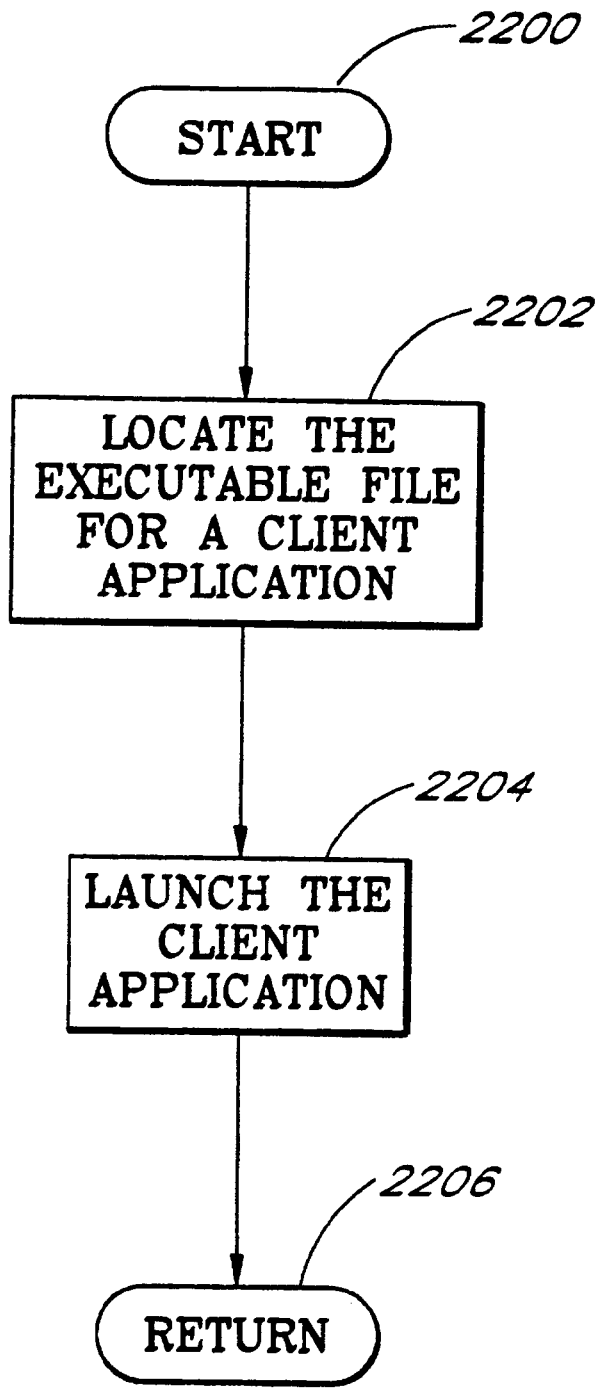
FIG. 22 is a flow chart illustrating one embodiment of the execute function which invokes an executable program associated with a leaf node in the on-line network of the present invention.

In state 1512, the present invention executes the application associated with the leaf node. For example, if the leaf node is a chat room, the present invention executes the client chat application. While in state 1512, the present invention starts a new process and launches the client application associated with the leaf node 206. Referring now to FIG. 22, a detailed block diagram of state 2112 is shown. The shell folder object 1104 begins in a start state 2200 and proceeds to state 2202.

In state 2202, the shell folder object 1104 runs the execute leaf function 1212 in the referenced navigator 304. In the preferred embodiment, the execute leaf function 1212 is called the HRMOSExec function and is herein referred to as the execute leaf function 1212. The execute leaf function 1212 uses the leaf node's 206 application identifier 220 to locate the executable file containing the client application in an application lookup table. For example, for a chat room, the execute leaf function 1212 uses the chat leaf node's 206 application identifier to locate the chat.exe executable for the client chat application.

Proceeding to state 2204, the execute leaf function 1212 calls the Execute function 1232 in the node pointer object 1108. The Execute function 1232 uses techniques known to one of ordinary skill in the art to start a new process in the local computer 102. A process is the dynamic invocation of a program along with the system resources required for the program to run. For example, a process may have its own memory address space, its own communication ports, and files, etc. After starting the new process, the Execute function 1232 returns control back to the shell folder object 1104.

For example, if the leaf node 206 is a chat room, the execute leaf function launches the chat client application in the newly created process. After launching the desired client application, the Execute function 1212 then returns control back to the execute leaf function 1212 in state 2204. Proceeding to state 2206, the execute leaf function 1212 returns back to state 1510 via return state 2206. In state 1510, the present invention waits for the next user input command.

4. Shortcuts

The present invention also provides "shortcuts" which reside in a user's local computer. These shortcuts allow the user to reference particular locations in the on-line network and directly jump to that particular location when the user activates the shortcut. For example, a user may periodically wish to access a bulletin board on gardening. As explained in more detail below, the user selects the desired bulletin board icon and drags the icon to a folder in his local computer. The network shell then creates a shortcut and places the shortcut in the selected folder of the user's local computer.

Figure 23:
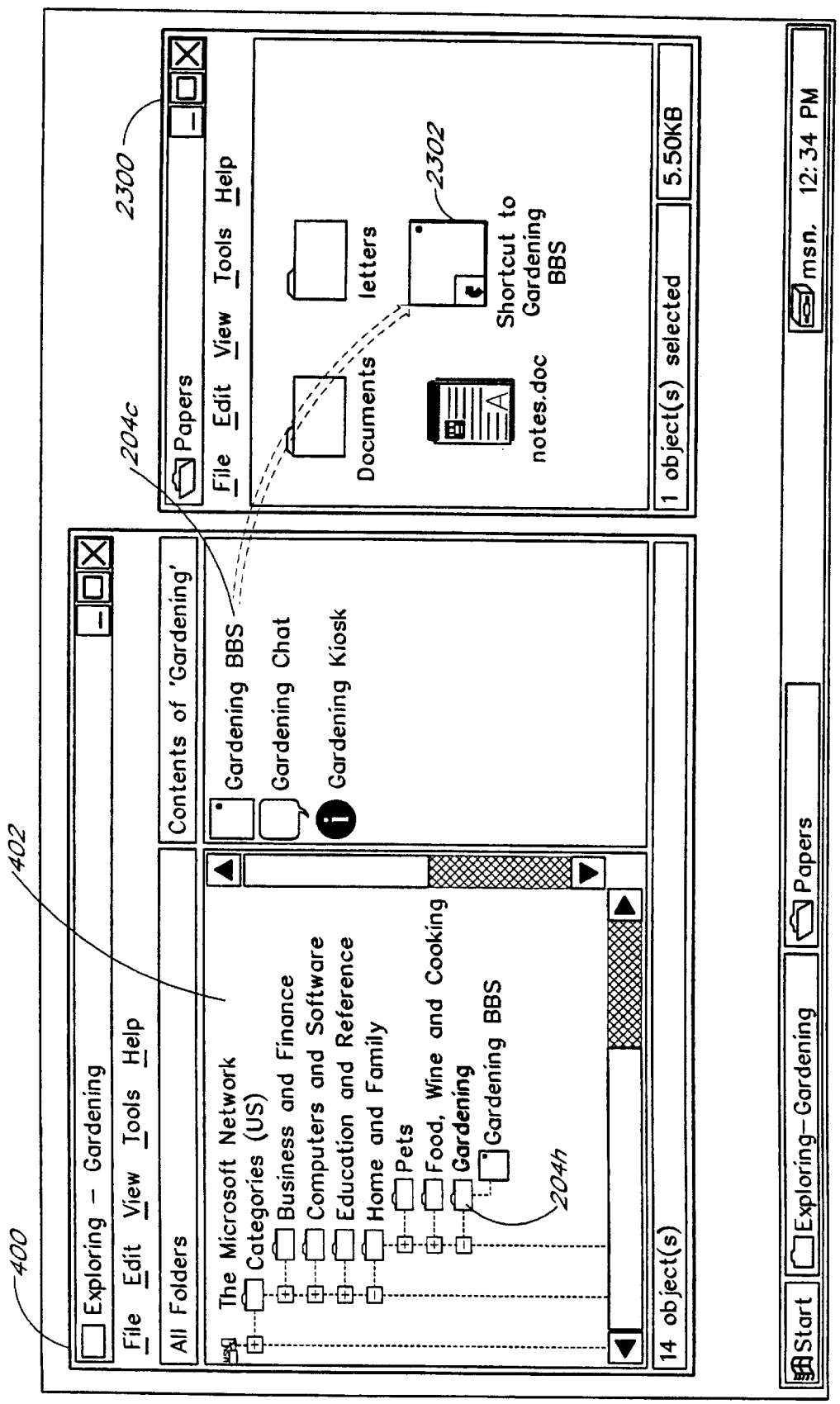
FIG. 23 is a diagram illustrating one embodiment of the user interface which shows a shortcut on the user's local file system.

Referring now to FIG. 23, the user interface associated with the creation of a shortcut is shown. FIG. 23 contains the two-pane window 400 created by the Win 95 Explorer and a second window 2300 which displays the contents of a user's local file system. The hierarchy map in the left pane 402 shows that the user is in the gardening folder node 204j. The right pane 404 shows the contents of the gardening folder node 204j which contains the gardening bulletin board 204c. The second window 2300 shows the contents of a folder in the user's local file system. The contents include a documents folder, a letters folder a document named notes.doc and a shortcut 2302 to the gardening bulletin board 204c.

In this example, the user has viewed a variety of nodes in the on-line network 100 as discussed above in FIG. 15. The user is currently in state 1508 and is viewing the contents of the gardening folder node 204j in the directory service namespace 202b. Accordingly, a gardening shell folder object 1104 and a gardening node pointer object 1108 exist in the data structure.

Figure 24:
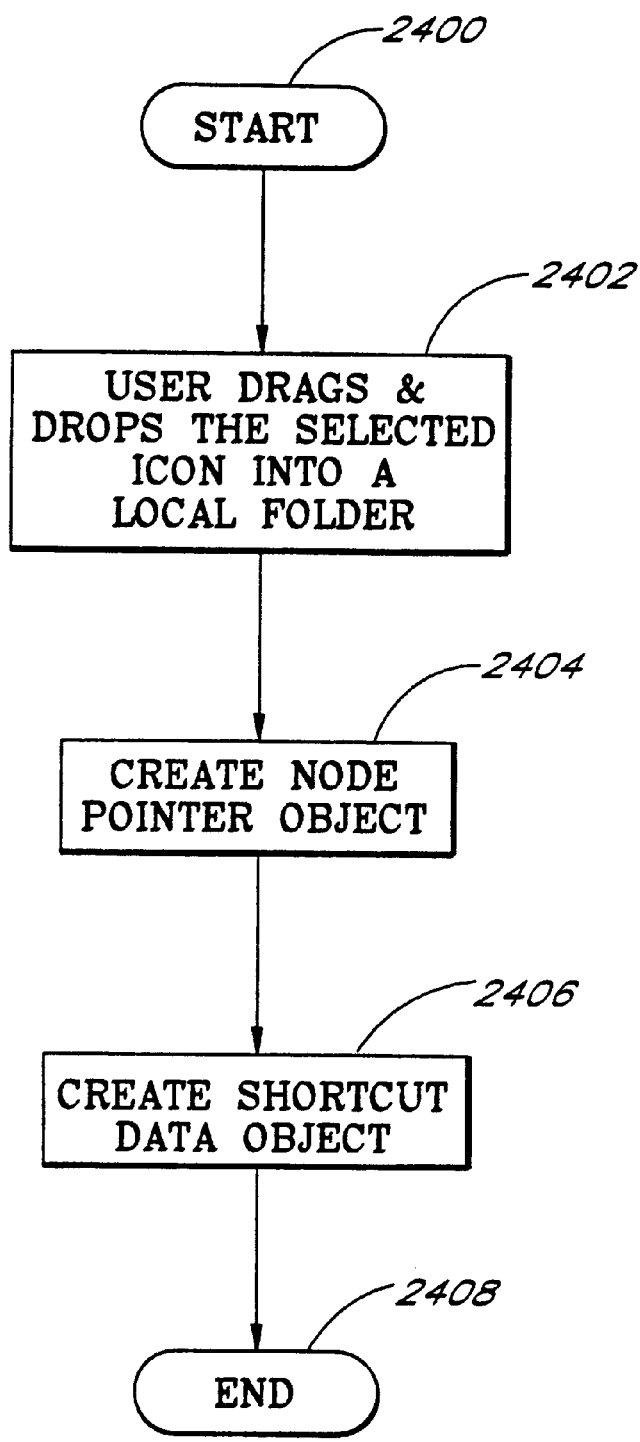
FIG. 24 is a flow chart illustrating the creation of a shortcut in a preferred embodiment of the present invention.

Referring now to FIG. 24, a flow chart illustrating the creation of a shortcut is shown. Beginning in a start state 2400, the preferred embodiment of the present invention proceeds to state 2402 where the user selects an on-line node and uses his mouse to drag and drop the selected node into his local file folder. While in state 2402, the navigator 304 calls the DoDragDrop function 1214 in the shell folder object 1104 in response to the user's selection and dragging of the node with his mouse input device. The shell folder object 1104 asks the navigator 304 what the user has selected and the navigator 304 then sends the network identifier 214 for the selected node to the shell folder object 1104.

For example, when the user selects the gardening bulletin board with his mouse and drags the gardening bulletin board to his local file system, the directory service navigator 304b calls the DoDragDrop function in the shell folder object 1104 associated with the gardening folder node 204j. The shell folder object 1104 then asks the navigator what the user has selected, and the navigator provides the shell folder object 1104 the network identifier of the gardening bulletin board 204c.

Proceeding to state 2404, the shell folder object then executes the create node function 1208 as discussed above, to create a node pointer object 1108 for the selected node. In this example, the create node function 1208 creates the node pointer object 1108 and references the bulletin board navigator 304c.

Figure 25:
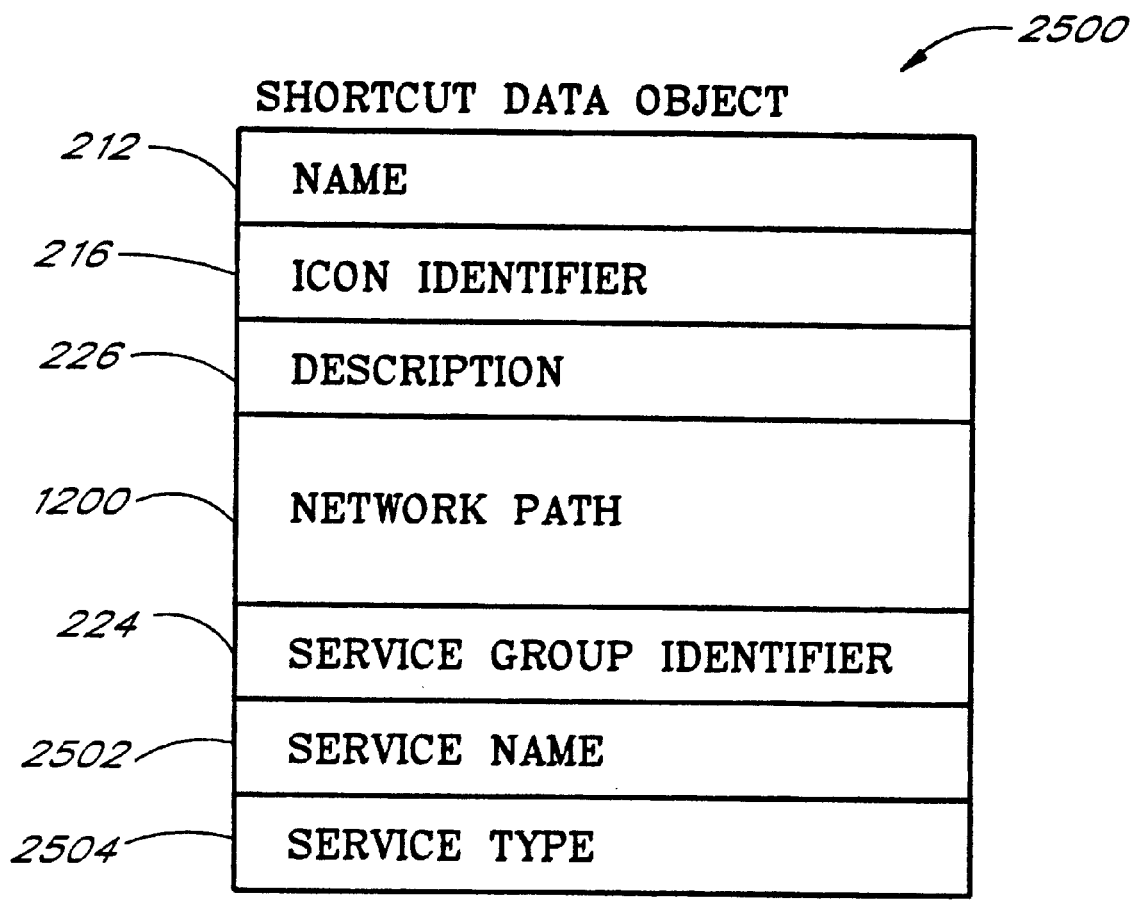
FIG. 25 is a block diagram of a shortcut data object in a preferred embodiment of the present invention.

Proceeding to state 2406 the shell folder object creates a shortcut data object for the selected node. The shortcut data object 2500 is illustrated in FIG. 25 and is compatible with the Object Linking and Embedding architecture. The shortcut data object 2500 contains the name 212, the icon identifier 216, the description 226, the network path 1200, the service group identifier 224 the service name 2502 and the service type 2504 of the selected node.

The name 212 includes the characters "shortcut to" and the name of the node. This name is the default format, but the user can alter the name 212 by selecting the shortcut data object 2500 and entering a new name. The icon identifier 216 identifies an icon bit map which represents the shortcut 2500. The description 226 holds a description of the node referenced by the shortcut data object 2500.

The network path 1200 contains the length header 1300, network identifier 214 and validator 1302 for each node in the path to the selected node. In the preferred embodiment, the selected node is the last node in the network path 1200 and is followed by the null data segment 1304. The service name 2502 is the name of the service associated with the selected node. In the preferred embodiment, the service name 2502 contains up to 32 characters. The service type 2504 describes the type of service associated with the selected node. For example, the service type 2504 could include "bulletin board," "folder," or chat.

In addition, the shortcut data object 2500 complies with data transfer formats known to one of ordinary skill in the art and the compound document files defined by the Object Linking and Embedding architecture as described in the in *OLE 2 Programmer's Reference Vol. I*, Microsoft Press, 1993, pp. 836–837 and in *OLE 2 Programmer's Reference Vol. II*, Microsoft Press, 1993, pp. 35 and Brockschmidt, *Inside OLE 2*, Microsoft Press, 1994, pp. 299–386.

While in state 2406, the shell folder object creates the network path 1200 for the selected node. In addition, the shell folder object 1104 calls the GetProperty function 1228 in the referenced navigator 304 to get the name 212, icon identifier 216 and description of the selected node. In this example, the network path 1200 contains the length header 1300, network identifier 214 and validator 1302 for each node in the path to the garden bulletin board node 204c.

The shell folder object 1104 then stores the shortcut data object 2500 in the user's local file system. In the preferred embodiment, the shell folder object 1104 stores the shortcut data object 2500 with an *.mcc extension. In this example, the shell folder object 1104 stores the gardening bulletin board shortcut data object 2500 in the papers folder in the user's local file system with an *.mcc extension. The shell folder object 1104 the proceeds to a return state 2408 which returns the present invention back to state 1510 as illustrated in FIG. 15. In state 1510, the present invention waits for the next user command.

Because the shortcut data object 2500 complies with the format defined by the Object Linking and Embedding architecture, a user can transfer or electronically mail the shortcut data object 2500 to others. This greatly improves the ease of maneuvering within the on-line network. For example, if a user wants his friends to use the gardening bulletin board, the user can simply electronically mail the gardening bulletin board shortcut data object 2500 to his friends. The friends can immediately access the gardening bulletin board 204c by invoking the gardening bulletin board shortcut data object 2500.

Thus, in this example, the user or his friends do not need to logon to the on-line network 100, maneuver to the proper location and then invoke the gardening bulletin board service. Instead, when the user selects the gardening bulletin board shortcut data object 2500 located in his local computer, the present invention automatically logs onto the on-line network 100, automatically maneuvers to the proper location and automatically launches the gardening bulletin board service.

Figure 26:
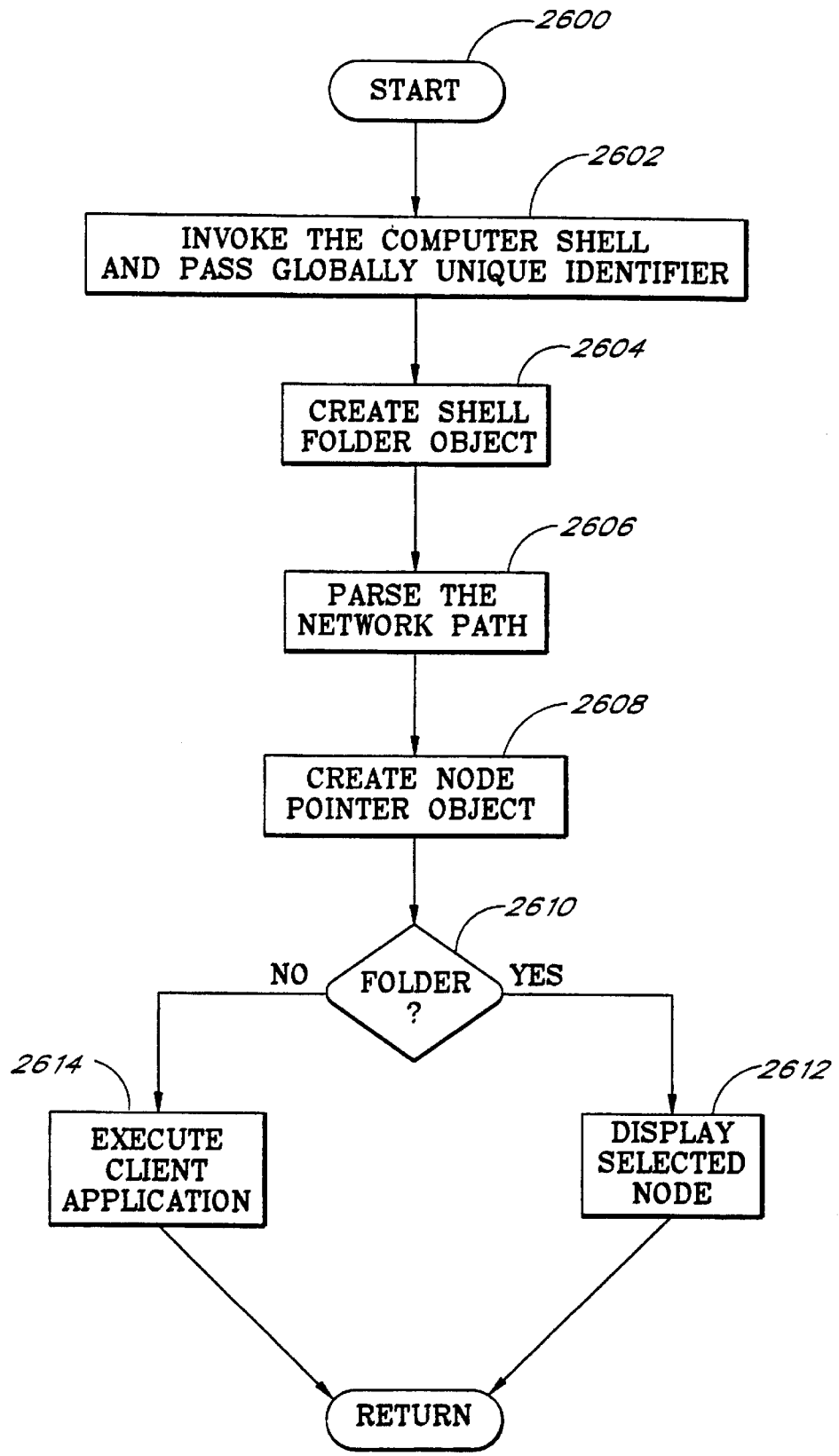
FIG. 26 is a flow chart illustrating the invocation of a shortcut in a preferred embodiment of the present invention.

When a user selects a shortcut data object 2500, the operating system uses the *.mcc extension of the shortcut data object 2500 to identify and invoke a CCDIALER executable program. Referring now to FIG. 26, a detailed flow chart of the CCDIALER program is shown. Beginning a start state 2600, the CCDIALER program proceeds to state 2602 and invokes the computer shell object 1100. Using the techniques described in state 1504, the computer shell object 1100 creates a shell folder object 1104. Proceeding to state 2606, the shell folder object 1104 parses the network path 1200 and obtains the network identifiers 214 for the last node in the network path 1200.

Proceeding to state 2608 the shell folder object calls the create node function 1208 as described in state 1506 above. The create node function 1208 then creates a node pointer object for the last node in the network path 1200. Proceeding to state 2610, the shell folder object uses the techniques described above in state 1510 to see if the last node in the network path 1200 is a folder node 204 or a leaf node 206.

If the last node in the network path 1200 is a folder node, the shell folder object calls the GetViewWndObject function 1226 in the referenced navigator 304, as described above, to display the contents of the folder node 204. Thus, if the shortcut data object 2500 contains a network path 1200 to a folder node 204, the present invention, automatically logs on to the on-line network 100, locates the desired folder node 204 in the on-line network 100 and displays the contents of the desired folder node 204 with the assigned navigator 304.

If, on the other hand, the last node in the network path 1200 is a leaf node, the shell folder object calls the Execute function 1232 as described in state 1512. The execute function 1512 and the shell folder object 1104 then locate and invoke the desired client application associated with the leaf node 206. For example, if the last node in the network path of the shortcut data object contains a chat leaf node 206. Thus, if the shortcut data object 2500 contains a network path 1200 to a leaf node 206, the present invention accesses the on-line network 100, locates the desired leaf node 206, spawns a new process and executes the chat client application which corresponds to chat leaf node 206.

While the above detailed description has shown, described and pointed out the fundamental novel features of the invention as applied to a preferred embodiment, it will be understood that various omissions and substitutions and changes in the form and details of the illustrated device may be made by those skilled in the art without departing from the spirit of the invention. Consequently, the scope of the invention should not be limited to the foregoing discussion but should be defined by the appended claims.

What is claimed is:

1. An access system for presenting the content of an interactive on-line network to a user, comprising:
   a plurality of navigator modules stored in an end-user station, said navigator modules adapted to communicate with an on-line network, each of said navigator modules configured to display a different user interface corresponding to different offerings on said on-line network;
   a network shell module stored in said end-user station, said network shell module in communication with said plurality of navigator modules, said network shell module having a plurality of network identifiers corresponding respectively to said plurality of navigator modules, each of said network identifiers further corresponding to a different offering in said on-line network, whereby said network shell module responds to each of said network identifiers to direct said identified navigator module to display said user interface; and
   a computer shell module stored in an end-user station, said computer shell module part of an operating system of said end-user station and in communication with said network shell module and said plurality of navigator modules, said computer shell module adapted to display a local file system user interface, wherein said computer shell module, said network shell module and said plurality of navigator modules interact to display said local file system user interface and said user interfaces corresponding to said offerings.

2. The access system of claim 1, wherein said plurality of navigator modules are capable of accessing a plurality of data sources.

3. The access system of claim 1, wherein said plurality of navigator modules contain a plurality of navigation functions, said navigation functions implementing said user interfaces.

4. The access system of claim 1, wherein the names of said navigation functions are standardized such that each of said navigator modules are identified with common navigation function names.

5. The access system of claim 1, wherein said offerings are represented as nodes in said on-line network.

6. The access system of claim 1, wherein said network shell module further comprises a navigation table wherein said navigation table associates each of said network identifiers with one of said navigator modules.

7. The access system of claim 6, wherein said network identifier further comprises an application identifier and a nodal identifier and wherein said navigation table associates each of said application identifiers with one of said navigator modules.

8. The access system of claim 1 further comprising a shortcut data structure stored in an end-user station, said shortcut data structure configured to store a network path which identifies the location of each of said offerings in said on-line network.

9. The access system of claim 8 wherein said network shell module locates said offering identified by said network path.

10. The access system of claim 1 wherein said network shell module is further configured to display a content map which displays the hierarchy of said offerings in said on-line network.

11. The access system of claim 1, wherein one of the said offerings is a news service, a weather service, a bulletin board service, an electronic mail service, a chat service, a media view service, or an interactive game service.

12. The access system of claim 8, wherein the shortcut data structure is a shortcut data object.

13. The access system of claim 8, wherein the shortcut data structure is an Object Linking and Embedding (OLE) object.

14. An access system for presenting the content of an interactive on-line network to a user, comprising:
   a network shell module stored in an end-user station, said network shell module adapted to access a plurality of offerings in an on-line network, each of said offerings having an associated set of properties; and a network cache stored in said end-user station, said network cache in communication with said network shell module, said network cache configured to store a copy of said set of properties associated with each of said offerings accessed by said network shell module, whereby said network shell module retrieves said copy of said set of properties from said network cache when accessing one of said offerings a second time.

15. The access system of claim 14 wherein said network cache only exists during a logon session.

16. The access system of claim 14 wherein each of said set of properties are stored in a nodal data structure in said end-user station.

17. The access system of claim 14 wherein each of said set of properties contains a node name, network identifier, icon identifier and description.

18. The access system of claim 17 wherein said network cache stores a copy of each of said nodal data structures and whereby said network shell module retrieves said copy of said nodal data structure from said network cache when accessing one of said offerings a second time.

19. The access system of claim 18 further comprising a plurality of navigator modules stored in an end-user station, said navigator modules adapted to communicate with said on-line network and said network shell module, each of said navigators adapted to display a different user interface.

20. The access system of claim 19 wherein each of said nodal data structures are configured to reference one of said navigators.

21. A machine for presenting a content map which illustrates the organization of information in an interactive on-line network, comprising:

an on-line network containing a plurality of offerings, each of said offerings linked together to form a hierarchical data structure;

a computer shell module stored in an end-user station, said computer shell module part of said end-user station's operating system, said computer shell module adapted to display said end-user station's file system; and a network shell module stored in an end-user station, said network shell module in communication with said computer shell module and said on-line network, said network shell module adapted to access said offerings in said on-line network, said network shell module further adapted to interact with said computer shell module to display a content map, said content map illustrating the organization of said end-computer's file system and the organization of said offerings in said on-line network.

22. The machine of claim 21, wherein each of said offerings has an associated network identifier and wherein said network shell module combines said network identifiers into a network path which identifies the location of one of said offerings in said on-line network.

23. The machine of claim 22, wherein a plurality of network paths identify a plurality of locations in said on-line network and wherein said computer shell uses said plurality of network paths to create said content map.

24. The machine of claim 21, wherein said offerings are nodes in said on-line network which are linked together to form an acyclic graph.

25. The machine of claim 21, wherein said on-line network further comprises:

a plurality of application servers interconnected by a local area network, each application server running at least one service application which implements an on-line service, different groups of said application servers running different service applications to provide different on-line services; and a plurality of gateway computers connected to said application servers by said local area network and connected to said end-user station via a wide area network, each gateway computer programmed to receive service requests from said end-user station and to route said service requests to application servers running corresponding service applications.

26. The machine of claim 25, wherein said network shell module is further adapted to access said service applications to obtain information about said offerings in said service applications.

27. An object-oriented access system for presenting the content of an interactive on-line network to a user, comprising:

a computer shell object stored in an end-user station, said computer shell object part of said end-user station's operating system, said computer shell object adapted to display a user interface;

a plurality of network shell objects stored in said end-user station, said network shell objects in communication with said computer shell object, each of said network shell objects corresponding to at least one of a plurality of nodes in an on-line network;

a plurality of node objects, said node objects stored in said end-user station, said node objects in communication with said network shell objects and said computer shell object, each of said node objects adapted to reference at least one of said plurality of nodes in said on-line network; and a plurality of navigator modules in communication with said node objects, each of said navigator modules configured to display a different user interface, wherein each of said node objects reference one of said navigator modules.

28. The object-oriented access system of claim 27 wherein each of said plurality of network shell objects includes elements for creating said node objects.

29. The object-oriented access system of claim 28 wherein each of said plurality of network shell objects includes the network path to one of said nodes in said on-line network.

30. The object-oriented access system of claim 29 wherein each of said plurality of network shell objects includes elements configured to format a plurality of said network paths and communicate said network paths to said computer shell object whereby said computer shell object displays a content map of said on-line network.

31. An access system for presenting the content of an interactive on-line network to a user, comprising:

a computer shell means for displaying a user interface, said computer shell means part of said end-user station's operating system;

a plurality of navigator means for communicating with an on-line network, each of said navigator means configured to display a different user interface corresponding to different offerings on said on-line network; and a network shell means for storing a plurality of identifiers corresponding respectively to one of said navigation means, said network shell means in communication with said computer shell module and said plurality of navigator means, whereby said network shell means responds to each of said identifiers to direct said identified navigator means to display said user interface.

32. The access system of claim 31 further comprising a network cache means for storing a copy of a set of properties associated with each of said offerings in said on-line network accessed by said network shell module.

33. The access system of claim 32 further comprising a shortcut means for directly accessing one of said offerings in said on-line network, said shortcut means containing a network path to one of said offerings, said shortcut means adapted for storage in said end-user station.

34. An access system for presenting the content of an interactive on-line network to a user, comprising:

a plurality of navigator modules stored in an end-user station, said navigator modules adapted to communicate with an on-line network, each of said navigator modules configured to display a different user interface corresponding to different offerings on said on-line network;

a network shell module stored in said end-user station, said network shell module in communication with said plurality of navigator modules, said network shell module having a plurality of network identifiers corresponding respectively to said plurality of navigator modules, each of said network identifiers further corresponding to a different offering in said on-line network, whereby said network shell module responds to each of said network identifiers to direct said identified navigator module to display said user interface; and a shortcut object stored in an end-user station, said shortcut object including a shortcut data structure configured to store a network path which identifies the location of each of said offerings in said on-line network.

35. The access system of claim 34 wherein said network shell module locates said offering identified by said network path.

* * * * *